Aug. 7, 1956  H. G. ENGLISH  2,757,552
HYDRAULIC CONTROLS FOR TRANSMISSIONS
Filed Dec. 30, 1948  11 Sheets-Sheet 1
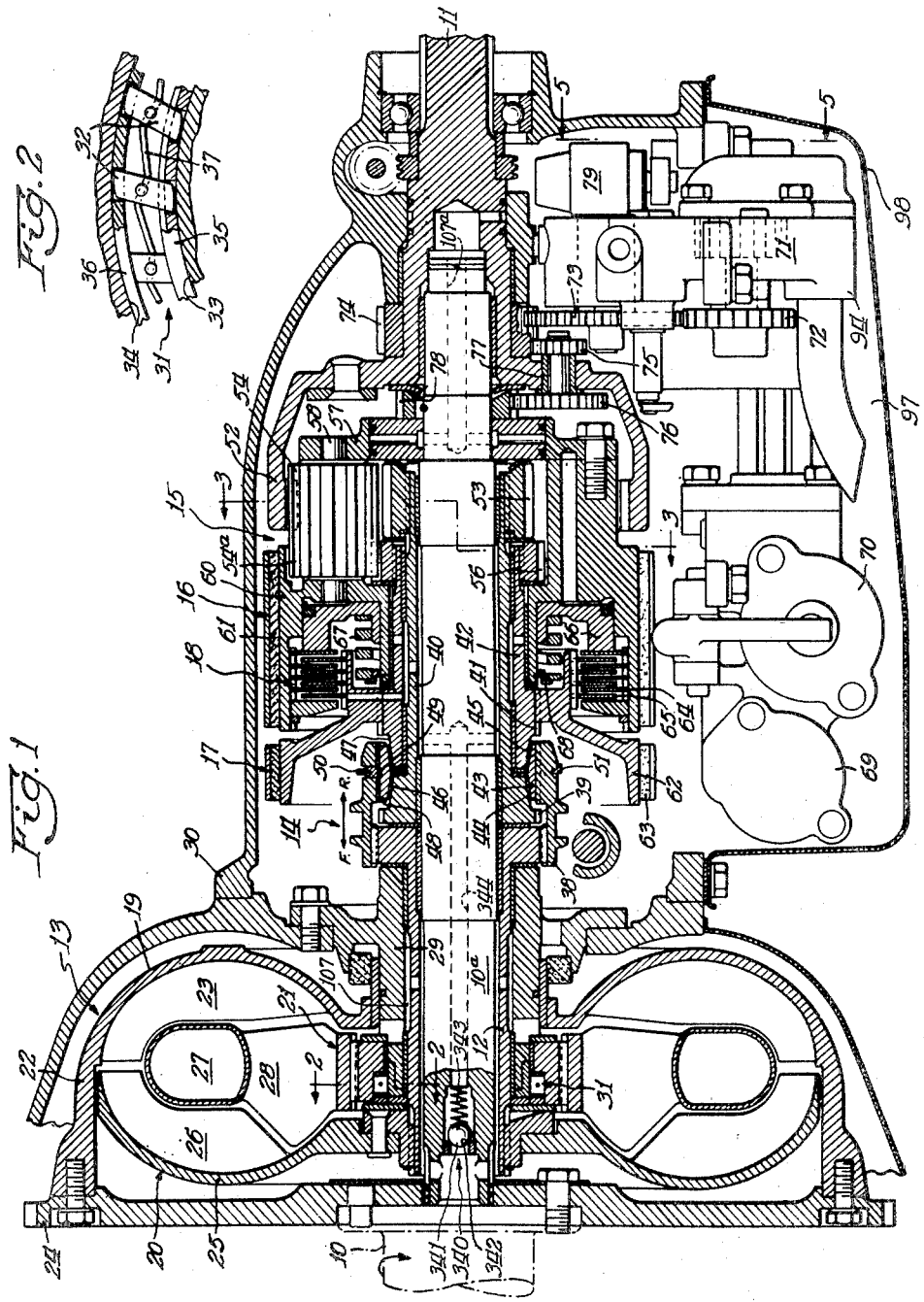
INVENTOR.
Herdis George English
By Edward C. Fitzhugh Aug. 7, 1956  H. G. ENGLISH  2,757,552
HYDRAULIC CONTROLS FOR TRANSMISSIONS
Filed Dec. 30, 1948  11 Sheets-Sheet 2
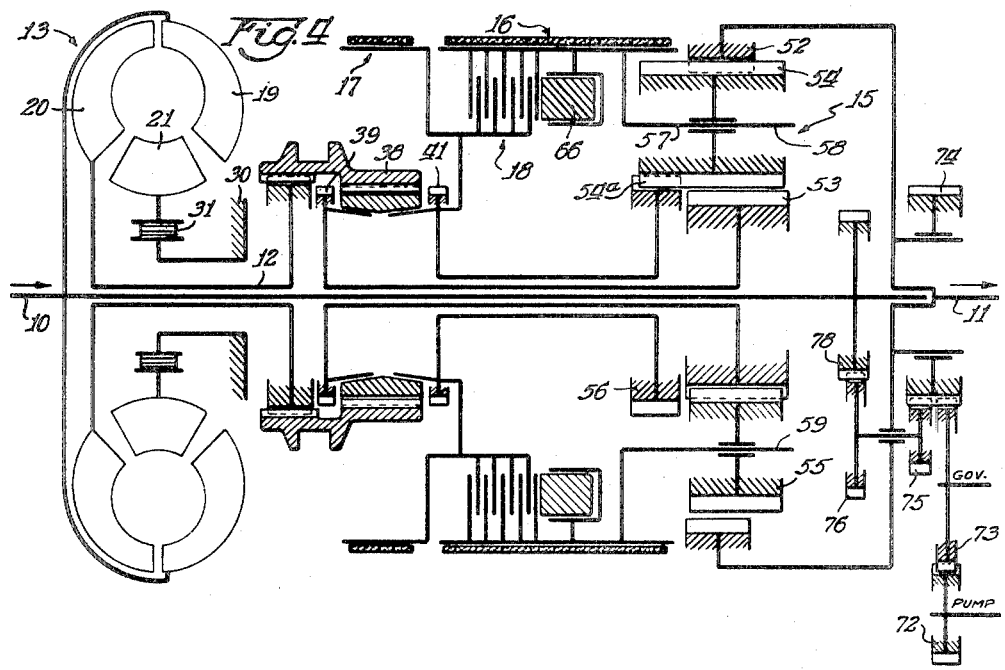
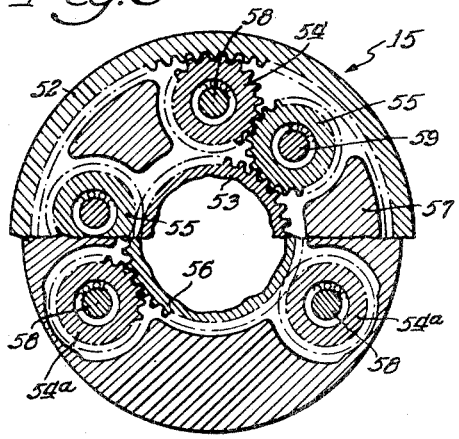
INVENTOR.
Herdis George English

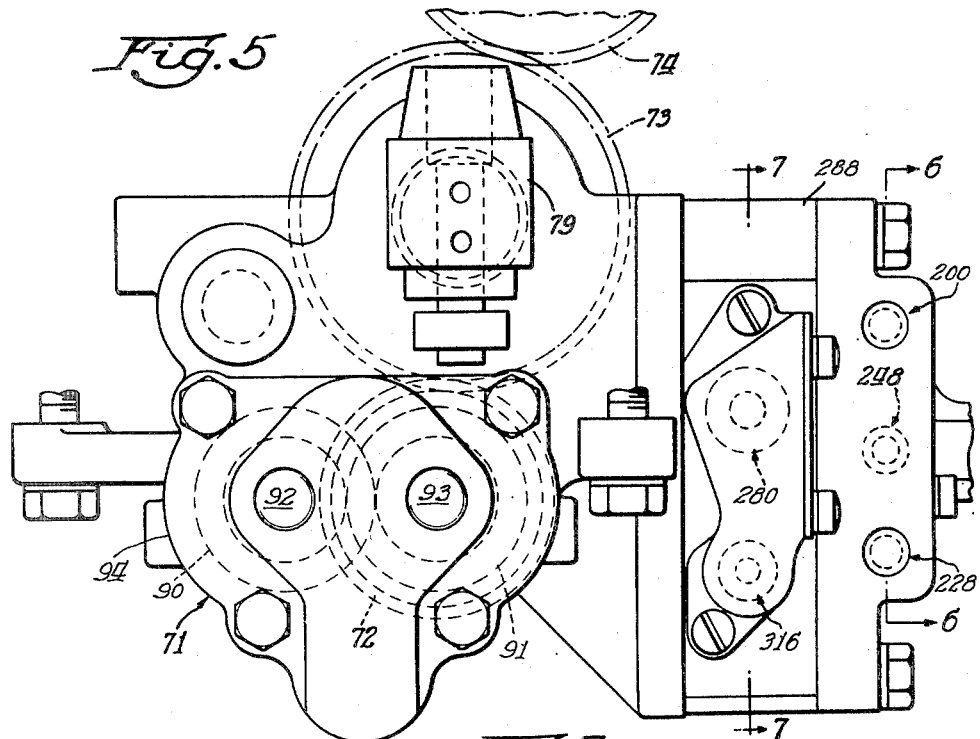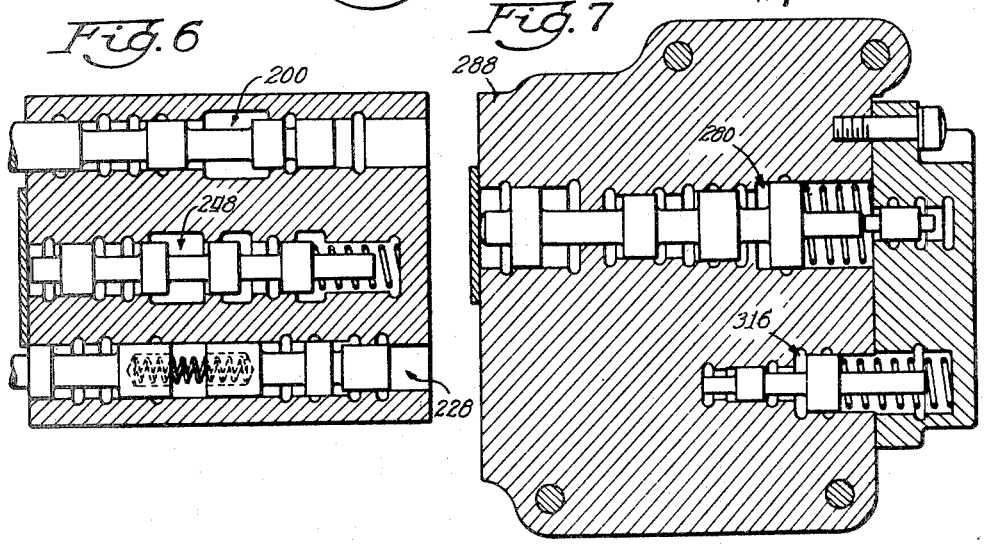

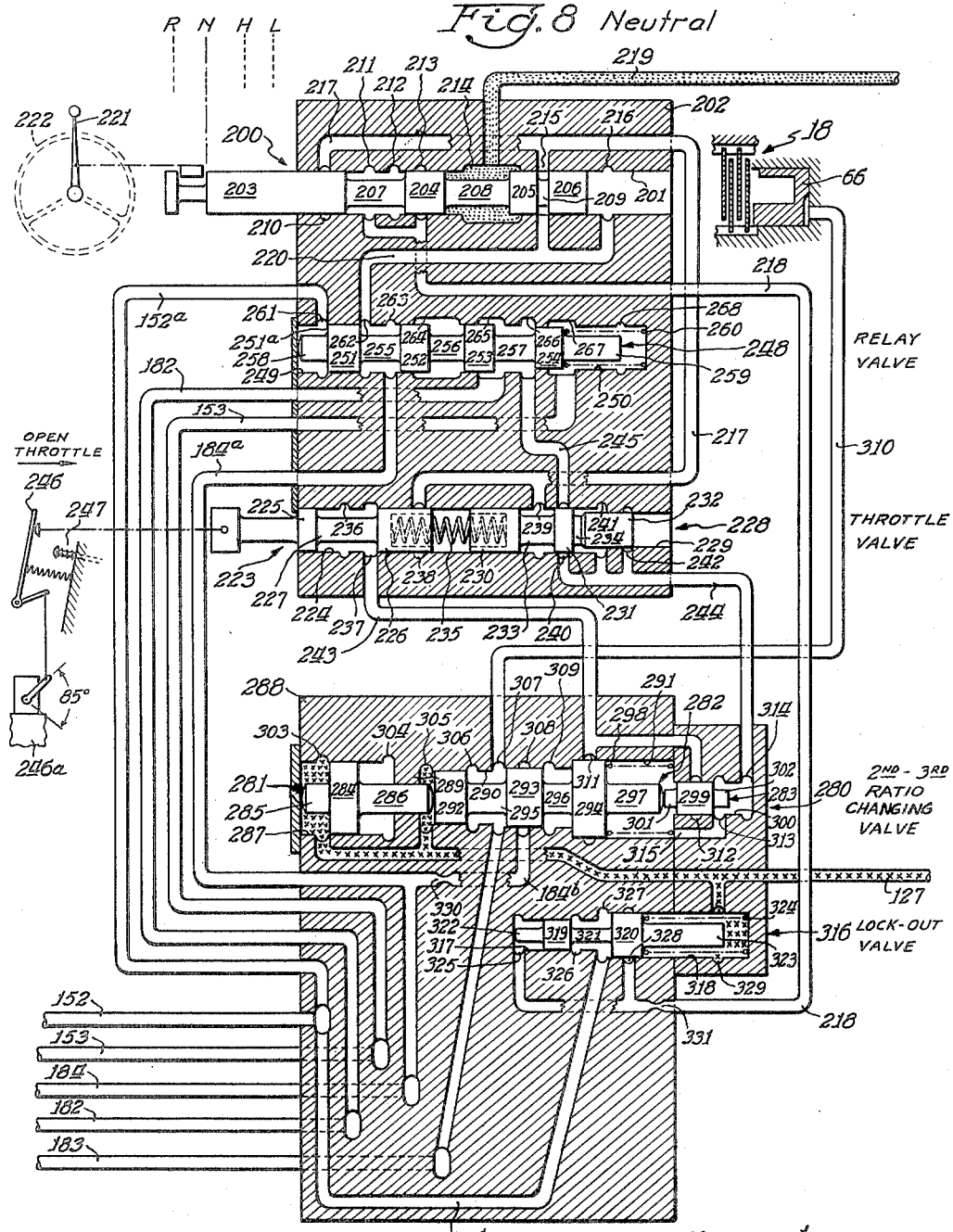

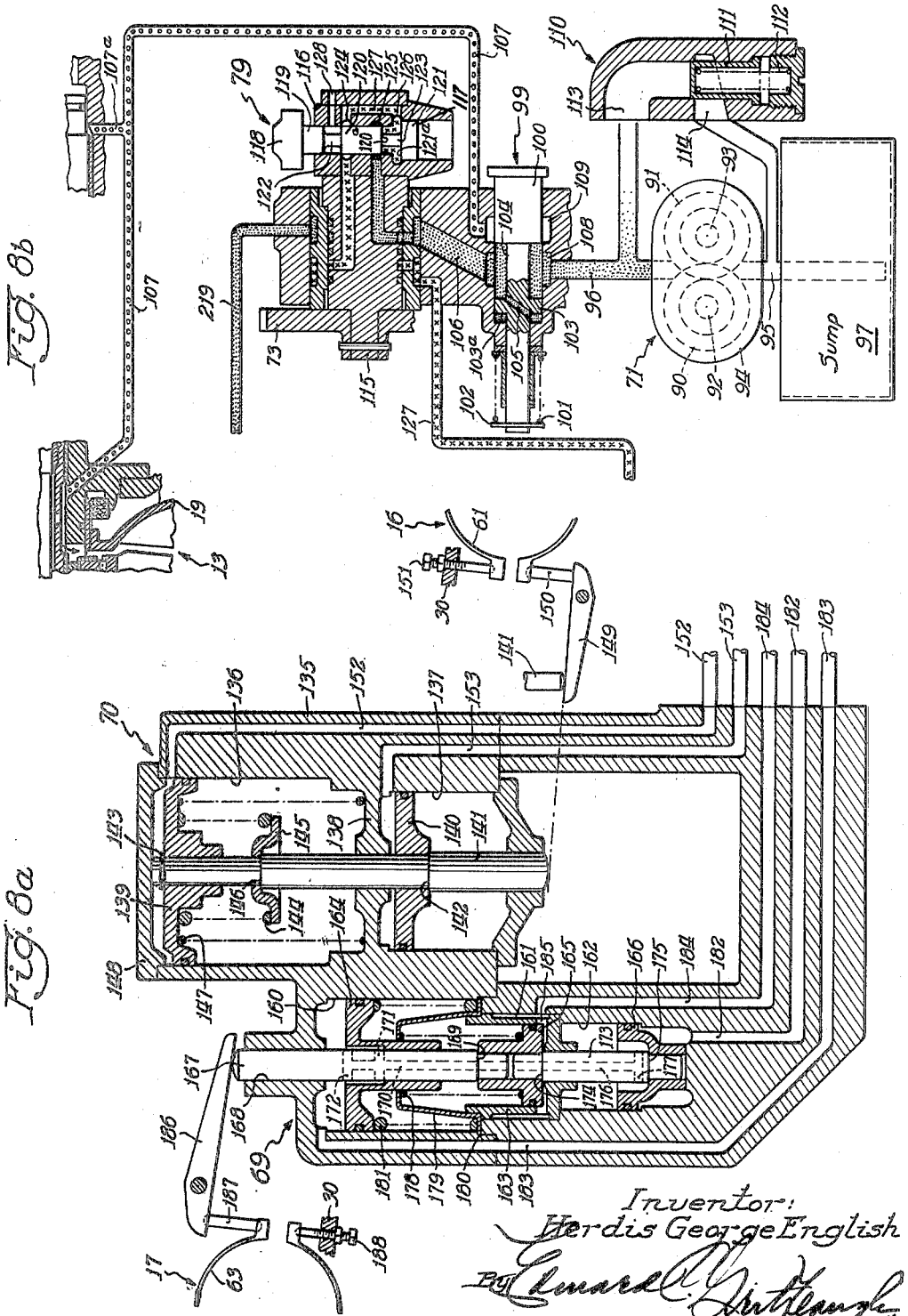

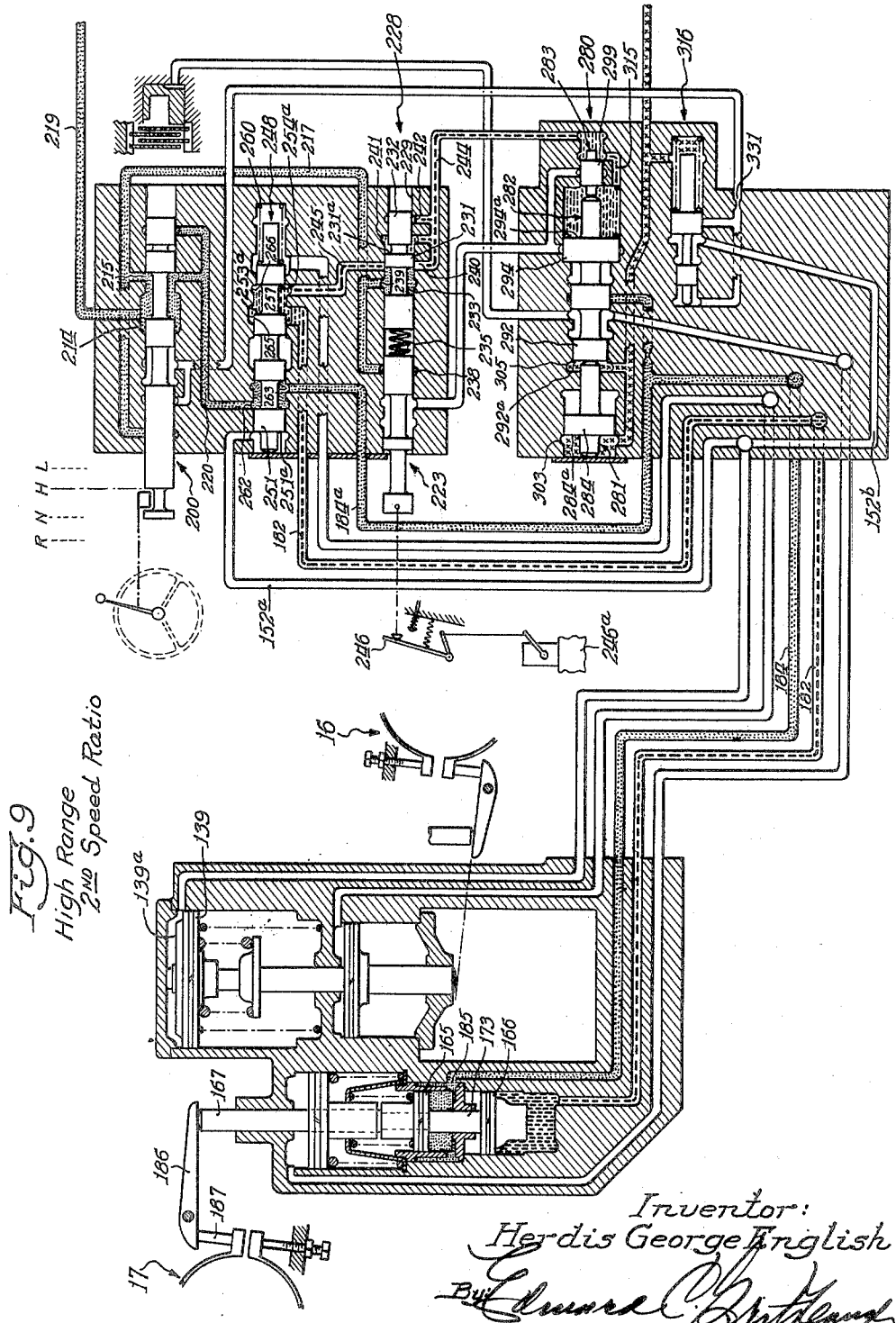
Fig. 9 High Range 2ND Speed Ratio
Inventor:
Herdis George English

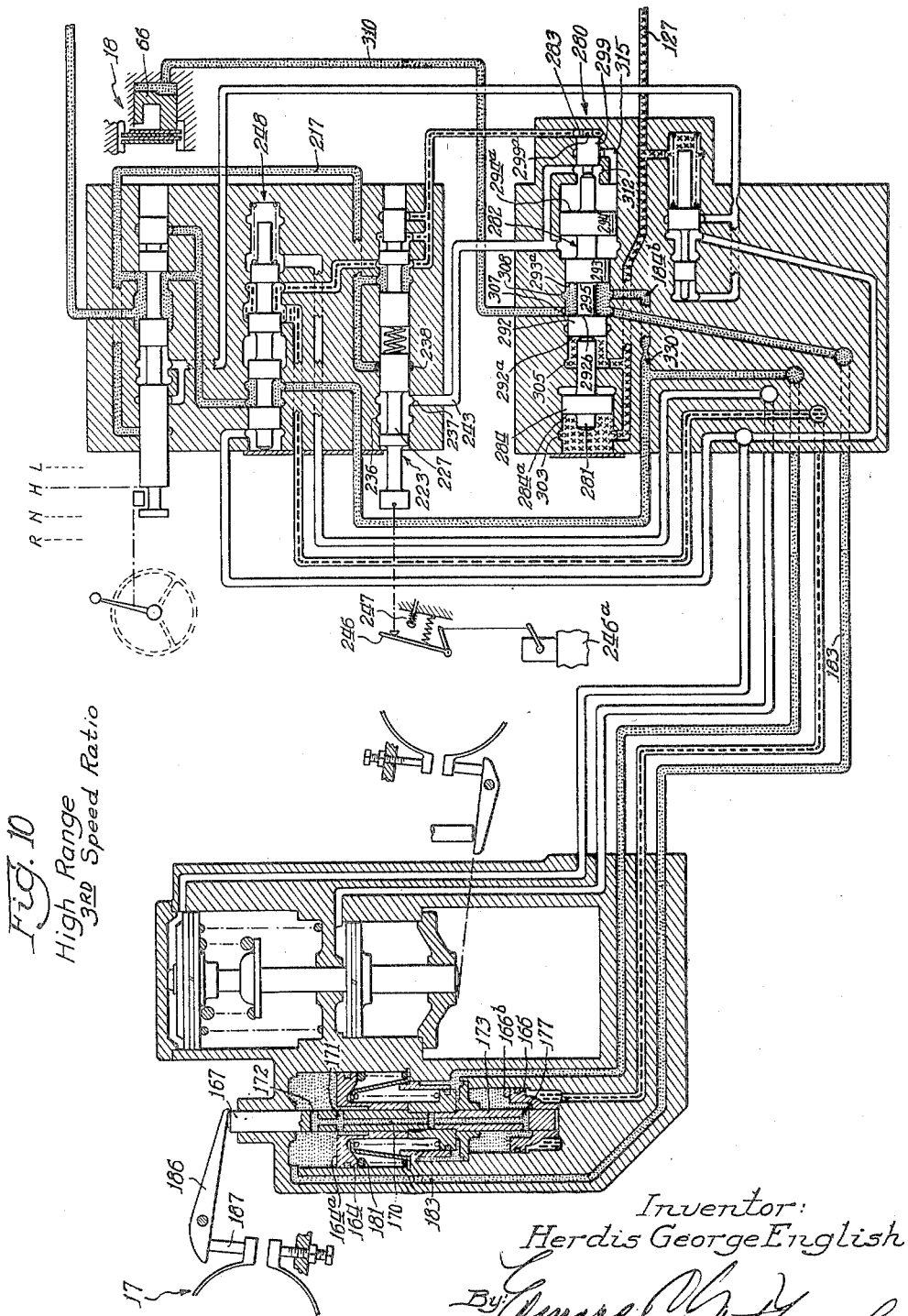

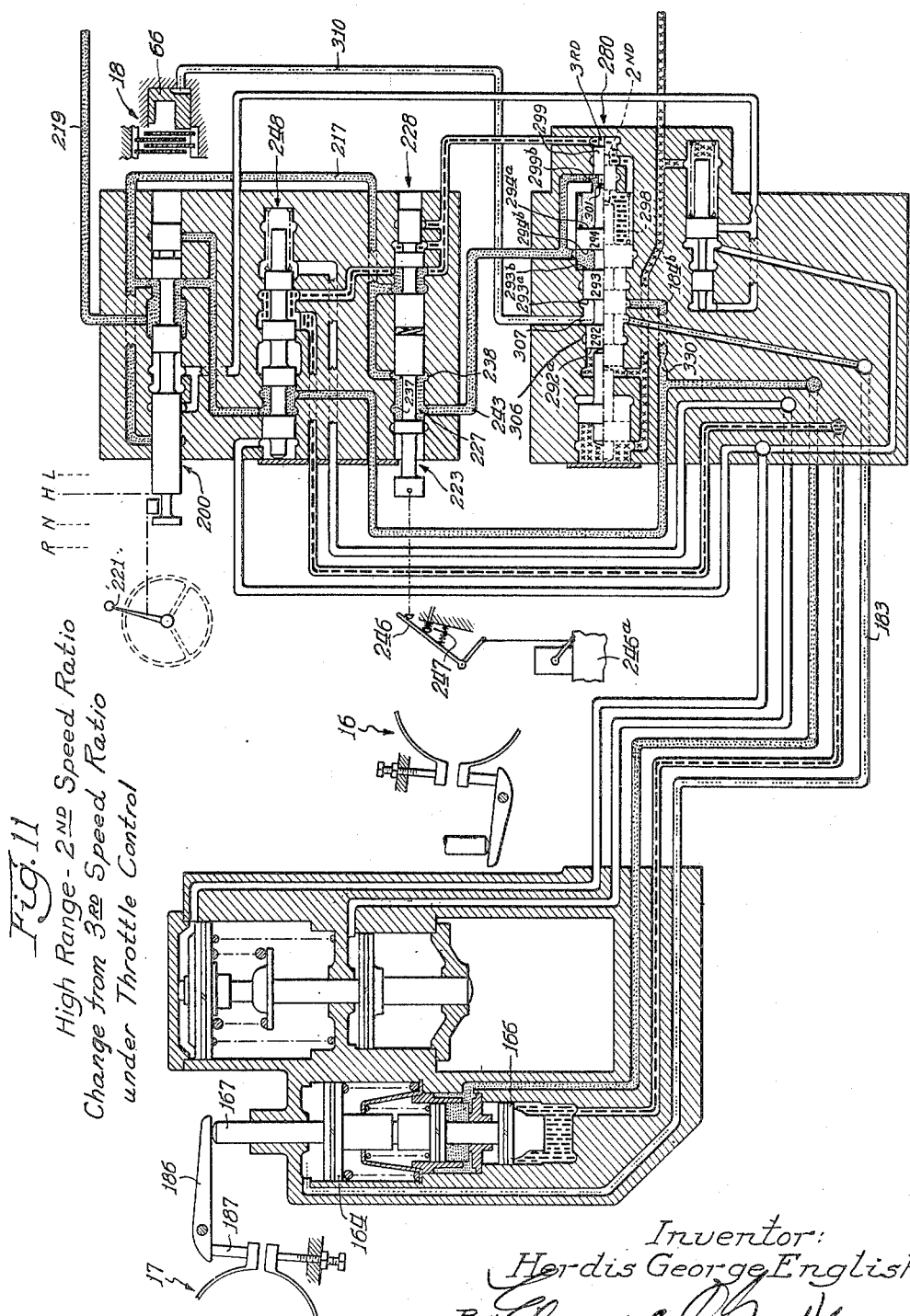

Aug. 7, 1956          H. G. ENGLISH          2,757,552
HYDRAULIC CONTROLS FOR TRANSMISSIONS
Filed Dec. 30, 1948          11 Sheets-Sheet 9
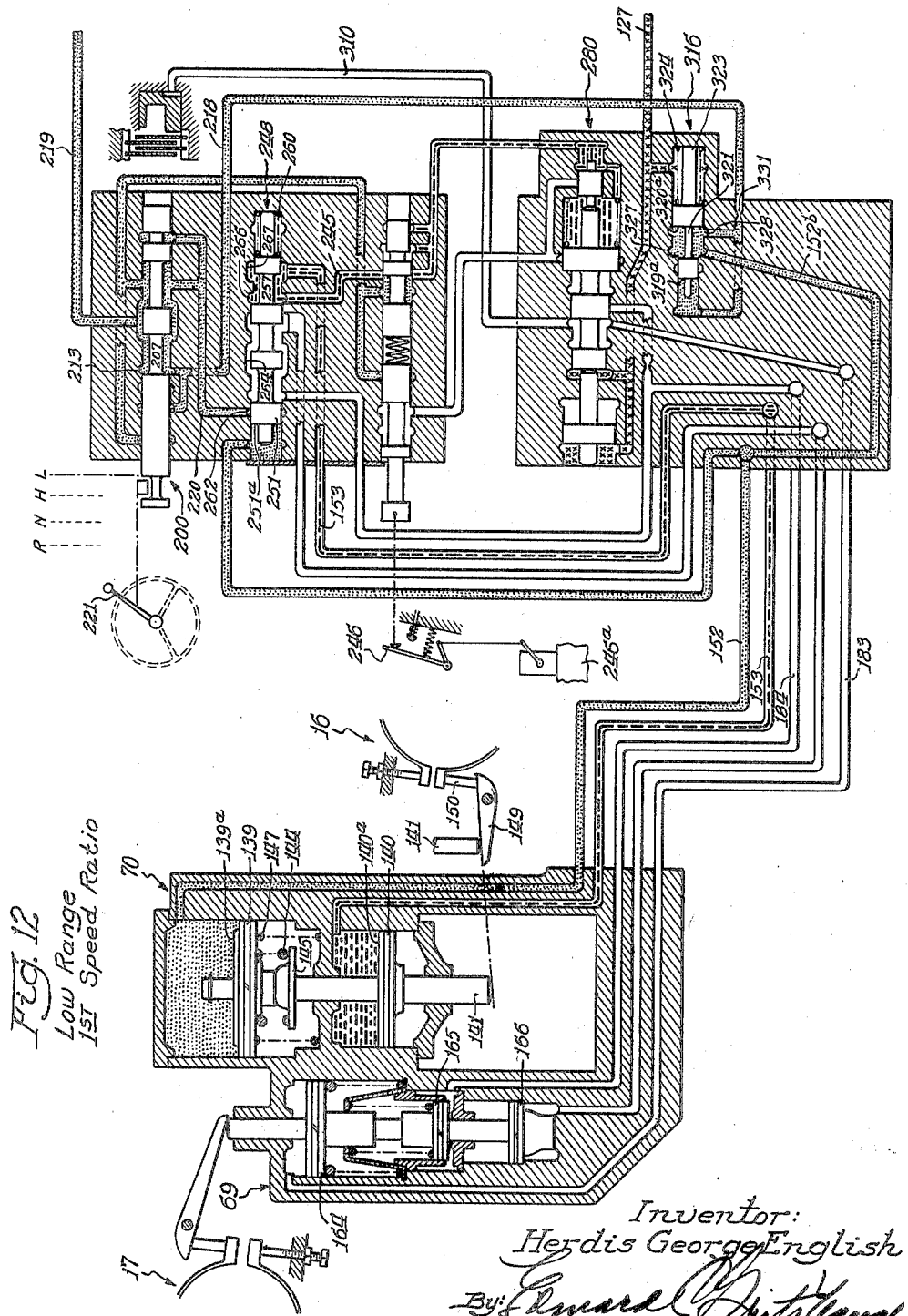

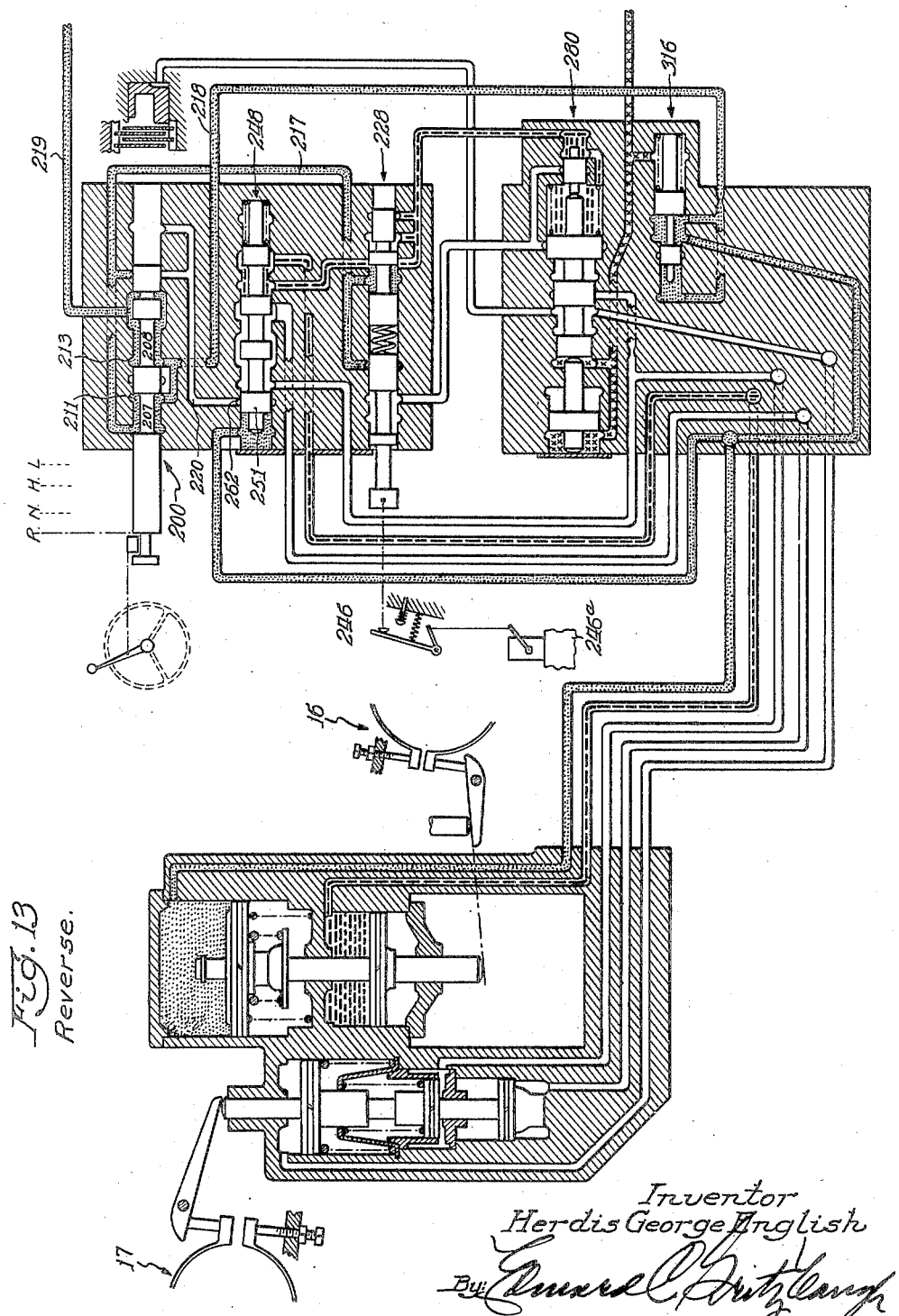

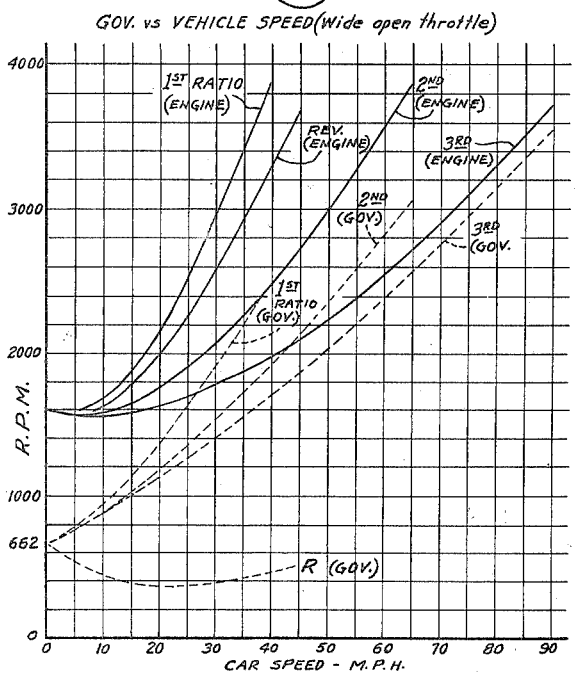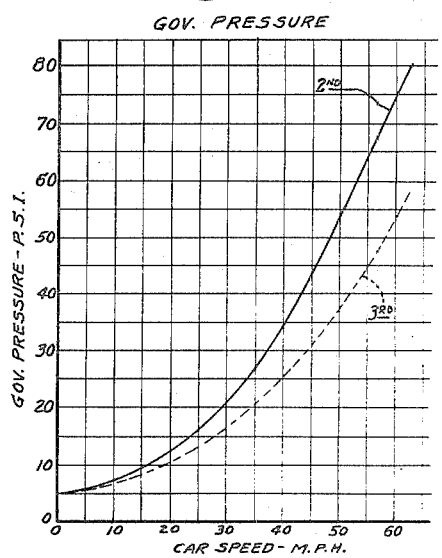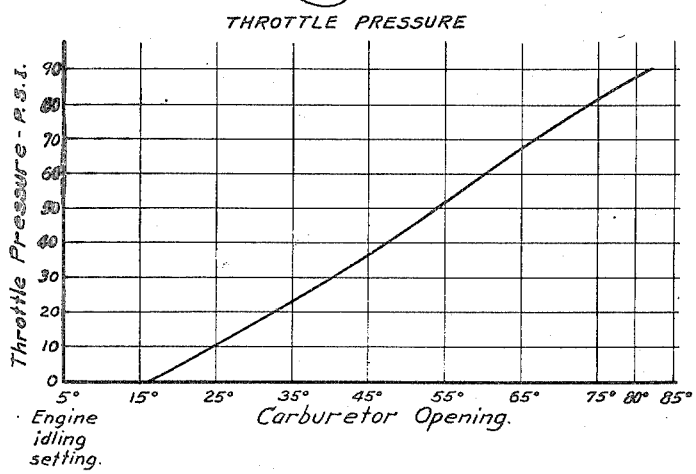

United States Patent Office 2,757,552
Patented Aug. 7, 1956

2,757,552

HYDRAULIC CONTROLS FOR TRANSMISSIONS

Herdis G. English, La Grange, Ill., assignor to Borg-Warner Corporation, Chicago, Ill., a corporation of Illinois Application December 30, 1948, Serial No. 68,342

34 Claims. (Cl. 74—472)

My invention relates to transmissions and more particularly to transmissions for automotive vehicles.

It is an object of the present invention to provide an improved hydraulic controlling system for automotive transmissions. It is contemplated that the transmission controlling system shall include fluid pressure applied motors for completing power trains through the transmission and a ratio change valve causing a change of the transmission between various speed ratios, and it is an object of the invention to apply a fluid pressure which varies in accordance with the degree of opening of the vehicle engine throttle or in accordance with the position of the accelerator of the vehicle, both to the ratio change valve and also to the motors for completing the various power trains. This fluid pressure, inasmuch as it varies with the opening of the engine throttle, may be termed a "throttle pressure" and is so referred to, hereinafter.

It is another object of the invention to provide a manual selector or control for a transmission coupled with automatic controls therefor so that the transmission may be changed under manual control into a low speed ratio and changed under manual control into a high range which includes an intermediate and a high speed ratio, and it is contemplated that the change between the intermediate and high speed ratios shall be automatic.

It is a further object of the invention to provide valve means in connection with such a transmission which prevents a change of speed ratio from the high range to the low speed ratio above a certain vehicle speed, even though the manual selector for the transmission is moved to its low speed ratio position.

It is a further object of the invention to provide controls which are adapted for use with a governor that is driven by both the drive and driven shafts of the transmission. Such a governor on a change from a lower speed ratio to a higher speed ratio may be expected to decrease in speed which would tend to cause an immediate reduction in speed ratio back into the original lower speed ratio, and it is an object to provide means for holding the transmission in its higher speed ratio after a change into this ratio has been made. In this connection it is contemplated that a ratio change valve may be utilized for causing a change between the lower and the higher speed ratios, and it is an object to provide lands on this valve which are of unequal area and have fluid pressure applied to them when the transmission is in its higher speed ratio so that there is a force on the valve holding the valve in its high speed ratio position.

It is another object of the invention to provide improved means for lubricating portions of the transmission and for supplying fluid under pressure to a hydrodynamic coupling device which may be included in the transmission.

It is an object of the invention to provide friction engaging means for completing relatively low and high speed ratios through the transmission and hydraulic mechanism in connection therewith which shall initiate engagement and disengagement of a first one of the friction engaging means at partial engaging pressures of the second engaging means to provide an overlap between engagements of the engaging means during which period of overlap both engaging means are partially engaged for providing a smooth change in speed ratio through the transmission. It is a further object of the invention to provide means under the control of the accelerator of the vehicle for increasing the overlap of engagements of the low and high ratio friction engaging means so that the engagement of the first engaging means is initiated at higher engaging pressures of the second friction engaging means.

It is another object of the invention to provide means under the control of the accelerator of the vehicle for changing the pressures of the engaging means, preferably for the low speed ratio, at which initiations of engagement and disengagement of the other friction engaging means, for the high speed ratio, take place, so that the engagement of the high speed ratio engaging means takes place sooner with a smaller decrease in pressure on the low speed friction engaging means with an increased opening of the vehicle throttle whereby the high speed ratio engaging means is able to take the added torque which follows from the decrease in vehicle engine speed for a change into a higher ratio with an open vehicle throttle.

The invention consists of the novel constructions, arrangements and devices to be hereinafter described and claimed for carrying out the above-stated objects and such other objects as will appear from the following description of a preferred embodiment of the invention with reference being made to the accompanying drawings, in which:

Fig. 1 is a longitudinal sectional view of a transmission in connection with which my improved control arrangement may be used;

Fig. 2 is a sectional view on an enlarged scale taken on line 2—2 of Fig. 1;

Fig. 3 is a sectional view taken on line 3—3 of Fig. 1;

Fig. 4 is a diagrammatic illustration of the transmission shown in Fig. 1;

Fig. 5 is a view on an enlarged scale taken on line 5—5 of Fig. 1;

Figs. 6 and 7 are sectional views taken respectively on lines 6—6 and 7—7 of Fig. 5;

Figs. 8, 8a and 8b together are a diagrammatic illustration of my improved control system for the illustrated transmission, with the system being shown for a neutral condition of the transmission;

Fig. 9 is an illustration of a portion of the control system conditioned for high range, with the engine throttle partially opened and the transmission driving in second or intermediate speed ratio;

Fig. 10 is an illustration, similar to Fig. 9 in extent, of the control system conditioned for high range, with the engine throttle partially opened and the transmission driving in third or high speed ratio;

Fig. 11 is an illustration, similar to Fig. 9 in extent, of the control system conditioned for high range, with the engine throttle fully depressed into a detent position to cause a change downwardly in speed ratio from high speed ratio to intermediate speed ratio;

Fig. 12 is an illustration, similar to Fig. 9 in extent, of the control system conditioned for low range with the engine throttle partially opened and with the transmission being in first or low speed ratio;

Fig. 13 is an illustration, similar to Fig. 9 in extent, of the control system conditioned for reverse drive with the throttle partially opened;

Fig. 14 is a graph showing the relation between the speed of the governor and the speeds of the vehicle engine or transmission drive shaft and of the transmission driven shaft in a certain embodiment of the invention;

Fig. 15 is a graph showing the relation between the hydraulic output pressure of the vehicle governor, which is of the hydraulic type, in a certain embodiment; and Fig. 16 is a graph showing the relation between the fluid throttle pressure and carburetor valve opening in a certain embodiment.

Like characters of reference designate like parts in the several views.

My improved transmission controlling arrangement may be used on the transmission illustrated and described in a copending application, Serial No. 25,064, filed May 4, 1948, in which Harold T. Youngren, Sidney V. Hettinger, Jr., and I are inventors. Referring to Figs. 1 to 5 in the present application, the transmission may be seen to comprise a drive shaft 10, a driven shaft 11, and an intermediate quill shaft 12. A hydrodynamic coupling device in the form of a torque converter 13 is provided effectively between the shafts 10 and 12 and a dual position clutch 14 is driven by the shaft 12. A planetary gear set 15, comprising friction brakes 16 and 17 and a friction clutch 18, is driven by the clutch 14 and drives the driven shaft 11. The transmission is intended to be useful for automotive vehicles, and the driving shaft 10 is adapted to be connected to the engine (not shown) of the vehicle and the driven shaft 11 is adapted to be connected to the driving road wheels (not shown) for the vehicle through any suitable driving mechanism, such as the ordinary propeller shaft and differential.

The torque converter 13 comprises an impeller 19, a runner 20 and a stator 21. The impeller 19 comprises a fluid casing 22 and impeller blades 23 fixed within the casing. The casing 22 is bolted to a flywheel 24 to which the shaft 10 in turn is bolted as shown. The runner 20 comprises a casing 25 in which runner blades 26 are fixed, and the runner is fixed to the shaft 12 as shown. The stator 21 comprises a core 27 and blades 28, and the stator is rotatably disposed on a hollow shaft 29 which is fixed with respect to the casing 30 of the transmission. A one-way brake 31 is disposed between the stator and the shaft 29 for allowing rotation of the stator freely in the forward direction, that is, in the same direction as the shaft 10 is driven by the engine of the vehicle, but preventing rotation of the stator in the reverse direction. The one-way brake 31 may be of any standard well-known construction, although a sprag type brake comprising sprags 32 adapted to wedge between opposite cylindrical surfaces 33 and 34 is illustrated. The sprags extend through windows in oppositely disposed sprag carriers 35 and 36, and a garter spring 37 extends through the sprags. The spring is effective to yieldingly wedge the sprags between the surfaces 33 and 34.

The casing 22 forms a container for fluid, such as oil, which constitutes the driving fluid for the converter 13. When the impeller 19 is rotated from the shaft 10 and flywheel 24, momentum is given the fluid, and the fluid drives the runner 20. The stator 21 functions to change the direction of flow of fluid so that the runner 20 is driven at a greater torque than is applied to the shaft and impeller 19. When the speed of the runner 20 increases above a predetermined speed relative to that of the impeller 19, the converter then functions as a simple two-element fluid coupling, and the runner is driven at the same torque as is applied to the impeller. The stator 21 at this time rotates freely forwardly, being allowed this rotation by the one-way brake 31 which releases. The construction of the torque converter is in accordance with well-known principles of such devices, and the operation of such a converter is also well-known, and hence further details of the construction and operation will not be further set forth here.

The intermediate shaft 12 which is connected with the runner 20 and constitutes the driven shaft of the converter 13 is connected to the positive clutch 14. This clutch comprises a shiftable sleeve 38 splined to the shaft 12 which is engageable with clutch teeth 39 formed on a sleeve shaft 40 and with clutch teeth 41 formed on a sleeve shaft 42. As will be hereinafter described in greater detail, the sleeve 38 when moved to engage with the teeth 39 functions to condition the planetary gear set 15 for forward drive and when moved in the opposite direction to engage with the teeth 41 functions to condition the gear set 15 for reverse drive. A synchronizer ring 43 having tapered surfaces 44 and 45 is disposed within the sleeve 38, and this ring is adapted to cooperate with tapered surfaces 46 and 47 on the shafts 40 and 42 respectively. A plurality of bars 48 are carried by the synchronizer ring 43, and these are provided with the indentations 49 which cooperate with poppet pins 50 disposed in suitable openings in the sleeve 38. A circular spring 51 is disposed around the shiftable sleeve 38, and this spring bears against the poppet pins 50 so as to yieldingly hold the pins in the indentations 49 in the bars 48.

The synchronizer ring 43, when moved in one direction or the other, due to the action of the pins 50 and spring 51, functions to synchronize either the shaft 40 or the shaft 42 with the shiftable sleeve 38, depending on the direction in which the sleeve 38 is moved. The sleeve 38 may then be brought into engagement either with the teeth 39 or the teeth 41 without clash. When the sleeve 38 is moved to the left as seen in Fig. 1, the surfaces 44 and 46 wedge to synchronize the speeds of the shaft 40 and sleeve 38, this wedging being brought about by the pins 50 carried by the sleeve 38 which are initially within the indentations 49 in the bars 48 and which thereby forcefully move the ring 43 into contact with the surface 46. After such synchronization of the parts 38 and 40, further movement of the sleeve to the left to engage with the teeth 39 causes the pins 50 to move outwardly against the action of the spring 51 since the synchronizer ring 43 cannot move any farther in this direction. The action of the synchronizer ring 43 in synchronizing the shaft 42 and sleeve 38 is the same in principle as when the sleeve 38 is shifted in the forward direction as just described.

The planetary gear set 15 comprises a ring gear 52, a sun gear 53, planet gears 54 in mesh with the ring gear, and planet gears 55 in mesh with the planet gears 54 and with the sun gear 53. The planet gears 54 are elongated pinions having gear portions 54a, and a sun gear 56 is in mesh with the gear portions 54a. The planet gears 54 and 55 are carried by a planet gear carrier 57 respectively by means of shafts 58 and 59 in the carrier.

The ring gear 52 is connected to the driven shaft 11 of the transmission; the sun gear 53 is splined on the shaft 40, and the sun gear 56 is splined on the shaft 42 as shown. The planet gear carrier 57 is rotatably disposed with respect to the shafts 40, 42 and 10. It will be noted that the shaft 10 has an extension 10a extending through the transmission to the driven shaft 11, and this extension is piloted in the driven shaft, and the carrier 57 is rotatably mounted on this extension.

The planet gear carrier 57 is braked by means of the brake 16, and the brake 16 comprises a drum 60 formed on the carrier and a friction band 61 wrapped around the drum. The brake 16 is for completing forward and reverse drive power trains as is described hereinafter in greater detail, and the band 61 is simply engaged with the drum in order to engage the brake 16. The band 61 is so anchored with respect to the casing 30 of the transmission that the band takes a reaction in either direction, as the reactions for forward and reverse drive are in opposite directions. The brake 17 is provided for braking the shaft 42 and thereby the sun gear 56, and this brake comprises a drum 62 splined on the shaft 42 and a friction band 63 adapted to engage the drum 62.

The clutch 18 is provided between the drums 60 and 62 and comprises friction discs 64 splined in the drum 60 and friction discs 65 splined to the drum 62. A piston 66 is provided for engaging the clutch 18, and this piston is disposed in a suitable cavity within the drum 60. A spring 67 is disposed between a washer 68 fixed with respect to the carrier 57 and the piston, and this spring functions to yieldably hold the piston 66 in its clutch disengaging position in which it is shown. The piston 66 may be moved to the left as shown in Fig. 1 to engage the clutch 18 by applying fluid at the back of the piston so that it moves against the action of the spring 67.

Suitable fluid pressure servo motors 69 and 70 may be provided for engaging the friction brake bands 63 and 61 respectively. Details of the motors 69 and 70 will be described and illustrated in connection with the hydraulic control arrangement for the transmission hereinafter to be described.

A pump 71 is adapted to be driven by mechanism connected with both the drive shaft 10 and the driven shaft 11. The pump has a drive gear 72, and this drive gear is connected by means of an idler gear 73 with a gear 74 which is rotatably disposed on the driven shaft 11. The gear 74 is in mesh with a gear 75 which is connected with a gear 76. As will be noted, the gears 75 and 76 are rotatably carried along with the ring gear 52 being rotatably disposed in the ring gear by means of a bushing 77. The gear 76 is in mesh with a gear 78 fixed with respect to the drive extension 10a. The transmission may also be provided with a hydraulic governor 79 hereinafter described in closer detail which together with the pump 71 is used for controlling the transmission, and the governor is driven by the idler gear 73.

The transmission provides low, intermediate and high speed drives in the forward direction and provides a drive also in the reverse direction. In the condition of the transmission in which it is shown, the transmission is in neutral and although the drive shaft 10 may be driven by the vehicle engine, there is no drive between the shafts 10 and 11.

The transmission may be conditioned for forward drive by moving the clutch sleeve 38 to the left as seen in Fig. 1 into its forward position in which it is engaged with the teeth 39 for thereby coupling together the intermediate shaft 12 and the quill shaft 40. During idling conditions of the vehicle engine, the shaft 12 is driven at idling speeds also, and assuming the vehicle to be stationary, the parts of the planetary gear set 15 as well as the shafts 40 and 42 to which the shaft 12 may be coupled with the coupling 14 are stationary. When the positive clutch sleeve 38 is moved to engage with the teeth 39, the synchronizer ring 43 during such movement and before actual engagement of the sleeve 38 and teeth 39 functions to start rotation of the shaft 40 and to synchronize the speeds of the shafts 12 and 40 with the surfaces 44 and 46 cooperating as is above described. After such synchronization, the sleeve 38 is moved farther to the left as seen in Fig. 1 to engage with the teeth 39, and the transmission is thus conditioned for forward drive. The shaft 40 and the parts 56, 53, 54, 55 and 57 of the gear set 15 are then rotating, being driven by the vehicle engine at idling speed through the converter 13.

Low speed forward drive through the transmission is completed by engagement of the friction brake 16, after the clutch 14 has first been moved into its forward drive position. The brake 16 functions to hold the planet gear carrier 57 stationary, and the drive proceeds from the shaft 40 through the gears 53, 55, 54, and 52 to the driven shaft 11. In low forward speed drive, as in all the other drive ratios provided by the transmission, the torque converter 13 is in the power train, with all of the power transmitted from the drive shaft 10 passing through the torque converter.

The transmission may be shifted from low speed forward drive to second or intermediate speed by engaging the brake 17 and disengaging the brake 16. As will be understood, the planet gear carrier 57 in low speed drive is the reaction member of the gear set, and engagement of the brake 17 to hold the sun gear 56 stationary for second speed drive causes the gear 56 to be the reaction member instead of the carrier. In this speed ratio the drive proceeds through the gear set and in particular through the gears 53, 55, 54 and 52 to the driven shaft 11, in the same manner as in low speed drive, but due to the fact that the sun gear 56 is now stationary, the driven shaft 11 is rotated at a faster speed than in low speed drive. It will, of course, be understood that this transmission may be started in intermediate speed instead of low speed, simply by initially engaging the brake 17 instead of the brake 16.

High speed forward or direct drive is obtained by disengaging the brake 17 and engaging the friction clutch 18. Engagement of the friction clutch locks together the carrier 57 and the sun gear 56 so that the parts of the gear set 15 all rotate as a unit. The shaft 40 is driven from the converter 13 as in the other forward speeds, and with the gear set 15 being locked up, the driven shaft 11 rotates at a one-to-one drive with respect to the shaft 40.

The transmission is conditioned for reverse drive by moving the clutch sleeve 38 to the right as seen in Fig. 1 into engagement with the teeth 41 for thereby coupling the shaft 12 with the shaft 42 and the sun gear 56. The synchronizer ring 43 functions similarly as when the transmission is conditioned for forward drive to synchronize the shafts 12 and 42 before the clutch 14 positively connects these shafts. With the positive clutch 14 being in its reverse drive position, the reverse drive power train is completed between the shafts 12 and 11 by engaging the friction brake 16. The planet gear carrier 57 is thus rendered a reaction member and rotation of the sun gear 56 causes a driving of the ring gear 52 and the driven shaft 11 in the reverse direction. The drive is from the gear 56 through the planet gears 54 to the ring gear 52.

The pump 71 may be driven by either of the shafts 10 and 11. When the shaft 11 is stationary, as when the vehicle is stationary, rotation of the shaft 10 and thereby the drive shaft extension 10a by the vehicle engine drives the pump through the gears 76, 75, 74, 73 and 72. The ring gear 57 is stationary, and the gears 75 and 76 rotate only about their own centers and not about the drive shaft extension 10a. Assuming the vehicle engine to be inoperative and the drive shaft 10 stationary, the pump 71 may be driven solely from the driven shaft 11, as by pushing or towing the vehicle. The ring gear 52 is fixed to the shaft 11 and the gears 75 and 76 carried by the ring gear are thereby rotated about the gear 78 fixed to the extension 10a, which is then stationary, so that these gears rotate within their bushing 77. Due to the difference in size of the gears 75 and 76, this rotation of the gears causes the gear 74 to rotate, and the pump gear 72 is thereby rotated through the gear 73. When both the shafts 10 and 11 are rotated, the gear 74 is also rotated to drive the pump 71, as will be apparent from an inspection of the structure. The gear 73 and thereby the governor are driven along with the gears 74 and 72, and the governor and pump rotate in geared relationship to each other. Incidentally, the speeds of the pump and governor vary quite closely with the speed of the driven shaft 11 at the higher ratios and speeds of the transmission.

The control system for the transmission will now be described with reference being made to Figs. 6 to 16 of the drawings.

The pump 71 is of an ordinary type and comprises gears 90 and 91 which are disposed respectively on the shafts 92 and 93. The gears are positioned within a casing 94 which is provided with an inlet conduit or passage 95 and an outlet passage 96. The shaft 93 has the gear 72 fixed thereon for driving the pump. The inlet conduit 95 is connected with the sump 97 of the transmission which is formed by an oil pan 98 on the bottom of the transmission.

A regulator valve 99 is provided for regulating the pressure of fluid discharged from the passage 96. This valve comprises a valve piston 100 slidably disposed in the casing 94 and acted on by a spring 101 disposed between a part fixed with respect to the casing 94 and a spring retainer washer 102 fixed on the end of the piston 100. The valve piston 100 is provided with a land 103 and a groove 104 and a passage 105 extending through the land 103. The regulator valve 99 is provided with a fluid discharge passage 106 which is connected with the passage 96 in which a regulated fluid pressure is obtained due to the action of the valve 99 as described hereinafter. A pressure conduit 107 is also provided in connection with the regulator valve which conduit takes the overflow from the valve. The conduits 106 and 107 are respectively connected with ports 108 and 109 in the casing 94.

An excess pressure valve 110 is provided in connection with the pump 71. The valve 110 comprises a plunger 111 slidably disposed in a cylinder provided in the casing 94 and acted on by a spring 112. The valve has a pressure passage 113 connected with the outlet conduit 96 of the pump 71 and a discharge passage 114 which is connected with the inlet passage 95 of the pump. The valve 110 is for the purpose of relieving excess fluid pressure in the passages 96 and 106 as will be hereinafter described.

The governor 79 comprises a rotatable shaft 115 connected with the gear 73, a sleeve 116 disposed in the shaft 115, and a valve piston 117 slidably disposed within the sleeve 116. The valve piston 117 has a weight 118 fixed thereto at one end, and the piston comprises lands 119, 120 and 121 with grooves 122 and 123 between the lands. The sleeve 116 is provided with ports 124, 125 and 126 adapted to receive or supply fluid to the valve piston 117.

The rotatable shaft 115 and the sleeve 116 have an extension of the conduit 106 provided therein, being connected to the port 125, and a passage 127 is provided in the sleeve 116 and shaft 115 connected with the ports 124 and 126. A fluid discharge passage 128 is also provided in the sleeve 116 and shaft 115 which is connected with the sump 97. As will appear from a description of operation given hereinafter, the conduit 127 is a governor regulated fluid pressure passage.

The motor 70 for the brake 16 comprises a casing portion 135 having cylinders 136 and 137 formed therein which are divided by a partition 138. A piston 139 is slidably disposed in the cylinder 136, and a piston 140 is slidably disposed in the cylinder 137. A piston rod 141 extends through both of the pistons 139 and 140 and also through the partition 138 dividing the cylinders 136 and 137. A shoulder 142 is provided on the rod 141 for preventing relative movement between the piston 140 and the rod 141 in one direction, and a spring washer 143 is provided in an appropriate groove in one end of the rod 141 for limiting the relative movement of the piston 139 with respect to the rod in one direction. A spring 144 is provided between the piston 139 and a spring retaining washer 145 disposed on a shoulder 146 on the rod 141 for yieldingly holding the piston 139 at the limit of its movement on the rod 141 against the retaining washer 143. Another compression spring 147 is provided between the piston 139 and the partition 138 functioning to hold the piston 139 and rod 141 at a limit of the movement of the rod 141 in which the rod bears against a cap portion 148 of the casing 135.

The piston rod 141 is connected to actuate the brake band 61 by means of a lever 149 and a strut 150. The strut is pivotally mounted with respect to one end of the band 61, and the other end of the band is fixed with respect to the transmission casing 30 by means of adjustable anchor screw 151. The casing 135 is provided with passages 152 and 153 therein which are adapted to provide fluid under pressure to the pistons 139 and 140 for engaging the brake band 61 by means of the lever 149 and strut 150.

The front servo brake motor 69 for the brake 17 comprises cylinders 160, 161 and 162 connected together and of successively smaller diameter and which cylinders are formed in the casing 135. A sleeve-like insert 163 is disposed in the cylinder portion 161 as shown. Pistons 164, 165 and 166 are slidably disposed in the cylinder portion 160, the sleeve 163 and the cylinder 162 as shown.

A piston rod 167 extends through an opening 168 in the casing 135, and this rod extends through the piston 164 and into the piston 165. The rod 167 is provided with a shoulder 169 which prevents any relative movement in one direction between the piston 165 and the rod 167. The rod is provided with a central passage 170 therethrough which is provided with ports 171 and 172.

A piston rod 173 is provided which extends through the sleeve 163 and into the pistons 165 and 166. The rod 173 is provided with shoulders 174 and 175 which prevent relative movement in one direction between the pistons 166 and 165. The rod 173 is provided with a central passage 176 therein having ports 177 at one end, and as shown, the central passage 176 is in communication with the central passage 170 within the piston 165.

A compression spring 178 is provided between the piston 165 and a sheet metal spring retainer sleeve 179 which rests on a shoulder 180 defining the end of the cylinder 160. A second compression spring 181 is provided between the piston 164 and the spring retainer sleeve 179.

A fluid conduit 182 is provided for applying fluid pressure to one side of the piston 166; a fluid conduit 183 is provided for applying fluid pressure to one side of the piston 164; and a fluid conduit 184 is provided for applying fluid pressure to one side of the piston 165 through ports 185 provided in the sleeve 163.

The brake band 63 is actuated by the piston rod 167 by means of a lever 186 acting by means of a strut 187 on one end of the band 63. The strut 187 is pivotally mounted with respect to the band, and the band is adjustably fixed at its other end by a screw 188 extending through the transmission casing 30.

The transmission is conditioned for neutral, reverse drive or for low and high ranges in forward drive by means of a manual selector valve 200. The valve is slidably disposed in a cylinder 201 formed in a valve casing 202. The valve 200 is provided with lands 203, 204, 205 and 206 and grooves 207, 208 and 209 between the lands. The cylinder 201 is provided with ports 210, 211, 212, 213, 214, 215 and 216. The port 210 is connected with a fluid conduit 217; the ports 211 and 213 are connected with a fluid conduit 218; the port 212 is an exhaust port connected with the sump 97; the port 214 is connected with a conduit 219; and the ports 215 and 216 are connected with a conduit 220 and also with the conduit 217. The conduit 219 is connected with the conduit 106 in the pump and governor casing 94, as shown.

The valve 200 has four principal positions which correspond to reverse, neutral and forward, high and low ranges, and is adapted to be controlled by means of a shift lever 221 disposed beneath the steering wheel 222 of the vehicle in which the transmission is installed. The valve 200 is connected by any suitable connecting linkage with the selector lever so that the valve may be shifted into any of its positions by means of this lever.

A throttle valve 223 is provided in a cylinder 224 formed in the valve casing 202. The valve 223 is provided with lands 225 and 226 and a groove 227 between the lands. The throttle valve 223 is connected with a throttle pressure regulator valve 228 disposed in the cylinder 224 and in a connected cylinder 229 of smaller diameter. The valve 228 comprises lands 230, 231 and 232 having grooves 233 and 234 therebetween. The land 232 is disposed in the cylinder 229 as shown. The valve 223 and the valve 228 have adjacent hollow ends, and a spring 235 is disposed between the valves and in their hollow ends as shown.

The cylinder 224 is provided with ports 236, 237, 238, 239, 240, and 241 and the cylinder 229 is provided with a port 242. The port 236 is an exhaust port connected with the sump 97, and the port 237 is connected with a fluid conduit 243. The port 238 is connected with the conduit 217; the port 239 is also connected with this conduit, and the ports 240, 241 and 242 are connected with a conduit 244. The port 240 is also connected with a conduit 245.

The valve 223 is controlled in accordance with the position of the accelerator 246 of the automotive vehicle by means of any suitable linkage so that when the accelerator is depressed toward open throttle positions, the valve 223 is moved to the right as seen in Fig. 8. The carburetor of the vehicle engine indicated at 246a is connected by the usual linkage with the accelerator 246. A yieldable detent mechanism 247 of any suitable construction is provided for the accelerator 246 which functions to form a yieldable stop for motion of the accelerator for purposes hereinafter to be described.

A relay valve 248 is disposed in cylindrical cavities 249 and 250 in the valve casing 202. The valve 248 comprises lands 251, 252, 253 and 254 and grooves 255, 256 and 257 between the lands and ends 258 and 259 of reduced diameter. A spring 260 is provided in the cylinder 250 for acting on the valve 248. The cylinders 249 and 250 are provided with ports 261, 262, 263, 264, 265, 266, 267 and 268. The port 261 is connected with a conduit 152a which is a branch of the conduit 152; the port 262 is connected with the conduit 220; the port 263 is connected with the conduit 184a which is a branch of the conduit 184; the port 264 is an exhaust port connected with the sump 97; the port 265 is connected with the conduit 182; the port 266 is connected with the conduit 245; the port 267 is connected with the conduit 153; and the port 268 is an exhaust port connected with the sump 97.

The control system includes a second to third ratio change valve 280 which comprises three valve portions 281, 282 and 283. The valve portion 281 comprises a land 284 and two reduced end portions 285 and 286. The land 284 is slidably disposed in a cylinder 287 provided in a valve casing 288, and the reduced end portion 286 extends through a partition 289 in the casing 288. The valve portion 282 is slidably disposed in connected cylinders 290 and 291 in the casing 288, and the valve portion comprises lands 292, 293 and 294 and grooves 295 and 296 and a reduced end portion 297. The lands 292 and 293 are slidably disposed in the cylinder 290, and the land 294 is slidably disposed in the cylinder 291. A compression spring 298 is provided between the land 294 and the end of the cylinder 291 as shown. The valve portion 283 comprises a land 299 slidably disposed in a cylinder 300, and the valve portion comprises also two end portions 301 and 302 of reduced diameter.

The cylinder 287 is provided with ports 303 and 304. The port 303 is connected with the conduit 127, and the port 304 is an exhaust port connected with the fluid sump 97. The cylinder 290 is provided with ports 305, 306, 307, 308, and 309. The port 305 is connected to the conduit 127; the port 306 is an exhaust port connected with the fluid sump 97; the port 307 is connected with the conduit 183 and is also connected with a conduit 310 which is connected to the clutch engaging piston 66; the port 308 is connected to a conduit 184b which is a branch of the conduit 184; and the port 309 is an exhaust port connected with the sump 97. The cylinder 291 is provided with a port 311, and this port is connected with the conduit 243. The cylinder 300 is provided with ports 312, 313 and 314. The port 312 is connected with the conduit 243; the port 313 is connected with the cylinder 291 by means of a passage 315 provided in the valve casing 288; and the port 314 is connected with the conduit 244.

A low range lockout valve 316 is provided in cylinders 317 and 318 formed in the valve casing 288. The valve 316 comprises lands 319 and 320 separated by a groove 321, and the valve comprises end portions 322 and 323 of reduced diameter. A spring 324 is provided for acting on the valve and is disposed between the land 320 and the end of the cylinder 318. The cylinder 317 is provided with ports 325 and 326. The port 325 is connected with the conduit 218, and the port 326 is an exhaust port connected with the transmission sump 97. The cylinder 318 is provided with ports 327, 328 and 329. The port 327 is connected with the conduit 152b which is a branch of the conduit 152; the port 328 is connected with the conduit 218; and the port 329 is connected with the conduit 127.

The conduit 184b is provided with an orifice 330 which is of substantially reduced diameter compared to the conduit, and the conduit 218 is provided with a similar orifice 331, both for purposes hereinafter to be described.

It will be noted that the conduit 107 (see Fig. 8b) is connected with the casing 19 of the converter 13. The converter is connected with a check valve 340 (see Fig. 1) which comprises a ball 341 held yieldably on a seat 342 by means of a spring 343, and the check valve is connected with a conduit 344 as shown.

It will be noted that the valves 200, 248, 223, 228, 280 and 316 together with the front servo motor 69 and the rear servo motor 70 are disposed adjacent the pump 71 and governor 79 beneath the shaft 11 and at the bottom of the transmission. The transmission is covered on its bottom by the oil pan 98 which is bolted to the transmission, and access may be had to the pump, governor and valves from the bottom of the transmission by removing the oil pan. These parts are generally those requiring the most service, and it is advantageous to have them accessible from the bottom rather than from the side at which there is more interference generally from various vehicle chassis members.

The transmission is controlled in its various speed ranges and for different directions of drive by means of the selector valve 200 and also by means of the dual position positive clutch 14. The selector valve 200 is shifted in opposite directions from its neutral position for forward and reverse drives as is the case with the dual position positive clutch 14, and if desired, the clutch 14 may be controlled also by means of the selector lever 221 by any suitable connections. When the valve 200 is moved to the right as seen in Fig. 8, it is moved first to its high range position, which is indicated, and by further movement it may be moved to its low range position. Fluid under pressure is supplied to the selector valve 200 from the conduits 96, 106 and 219 which are in communication with each other.

The fluid under pressure is supplied for the hydraulic system from the pump 71. As has been explained, the pump is driven by either or both of the drive and driven shafts 10 and 11, so that fluid pressure is available when either or both of the shafts 10 and 11 are rotating. The fluid is drawn from the sump 97 in the bottom of the transmission through the passage 95 and around the gears 90 and 91 of the pump and is discharged into the outlet conduit 96 of the pump. The pump 71 is of standard design, and hence no further description is deemed necessary of its operation.

The regulator valve 99 functions to regulate the fluid pressure in the conduit 96 and the conduit 106 connected therewith to a maximum predetermined value, for example, 90 lbs. per sq. in. in a certain embodiment of the invention. The fluid under pressure in the passages 96 and 106 is in communication with the face 103a of the land 103 of the valve 99 by means of the passage 105, and the fluid pressure on this face functions to move the valve piston 100 to the right as seen in Fig. 8b against the action of the spring 101. This movement of the piston 100 occurs when the predetermined fluid pressure in the passages 96 and 106 is reached, and the excess fluid is discharged through the conduit 107. The piston 100 in this position has its groove 104 in restricted communication with the port 109 connected with the conduit 107 and hence this escape of fluid through the passage 107.

The fluid in the passage 107 is supplied for lubrication purposes and is also supplied to the converter 13 for maintaining it filled with fluid so that there may be a drive through the converter. As is shown, the conduit 107a is connected with the conduit 107, and the conduit 107a extends through the drive shaft extension 10a and provides lubricating fluid for rear portions of the transmission. The conduit 107 is connected with the converter 13, and the converter discharges through the check valve 340 which functions to maintain the fluid pressure in the converter above a predetermined optimum value. The fluid discharging through the check valve 340 flows through the conduit 344, and this fluid functions to lubricate forward portions of the transmission.

Under ordinary circumstances, leakage of fluid through the conduits 107a and 344 between the parts of the transmission lubricated by the fluid flowing through these conduits is sufficient so that the regulator valve 99 alone provides the proper fluid pressures in the conduits 107 and 106. However, when the oil in the transmission is cold, for example, the conduit 107 does not provide the necessary fluid escape, and the relief valve 110 functions in this case to return some of the fluid discharged by the pump back to the inlet passage 95 to circumvent the pump. In this case, the fluid flows through the passage 113 and moves the plunger 111 downwardly as seen in Fig. 8 whereby fluid from the passage 113 flows past the plunger 111 and through the passage 114 back to the pump inlet 95. During ordinary operation when the oil in the transmission is at usual operating temperatures, the plunger 111 is closed and the passage 113 is blocked thereby.

The governor 79 is geared to the pump 71 and is driven at speeds proportional to the speeds of the pump. The transmission is adapted to be automatically changed between its second and third speed ratios, and this change is under the influence of the governor 79, which during ordinary operating speeds of the vehicle has speeds roughly approximating the speed of the driven shaft. As will be hereinafter described, the low speed ratio of the transmission is intended to be obtained by an actuation of the selector valve 200 to its low speed position. The graph in Fig. 14 may be referred to for an understanding of the manner in which the governor speed varies with the speed of the vehicle in the various speed ratios. The vehicle engine speeds are also incidentally shown, and the curves are intended to be for the condition of wide open throttle of the vehicle engine. The governor speed varies incidentally in accordance with the throttle opening; however, at ordinary vehicle running speeds in second and third speed ratios, this variation of the governor speed is not great. The particular values shown in the Fig. 14 graph, as well as those shown in the graphs of Figs. 15 and 16, are for particular installations of the transmission control system and are not intended to limit the invention in any manner.

The port 125 in the sleeve 116 of the governor is the fluid pressure port connected with the pressure conduit 106 from the pump 71. The weight 118 on the end of the valve piston 117 tends to move the piston outwardly in the sleeve 116 according to the speed of the governor and its shaft 115. On such movement of the piston 117, fluid from the port 125 enters the groove 123 of the piston 117 and enters the passage 127 in the governor through the port 126. The fluid pressure in the groove 123 acts on the unbalanced piston areas 120a and 121a, and since the latter area is larger, this fluid under pressure tends to move the valve piston 117 back to its initial position in which the land 120 blocks the port 125. As will be appreciated, the greater the speed of the governor shaft 115, the greater is the centrifugal force on the weight 118 tending to move the valve piston 117 outwardly and the more fluid under pressure will be admitted to the passage 127 before the pressure in this passage is effective to again close the fluid pressure inlet port 125. The passage 127 is connected to various valves as has been described, and there is ordinarily sufficient leakage in these valves and other connections with the passage 127 that during operation of the governor at any one speed, the valve piston 117 by means of its land 120 successively opens and blocks the port 125 or reaches a stable condition opening the port 125 a certain small amount for maintaining a predetermined fluid pressure in the passage 127 and connected conduits without any other means being necessary for the relief of fluid pressure in the conduit 127. Upon an increase of speed of the governor shaft 115, the fluid pressure in the governor passage 126 increases as has been described, and when the governor shaft speed decreases, the land 120 will block the port 125, and the leakage in the passage 127 and connected conduits and valves will decrease the pressure in the passage 127 to a pressure corresponding to the decreased governor speed.

The relief passage 128 is also provided in the governor; however, under the higher values of governor speed, this passage is not utilized. When the governor speed and the corresponding fluid pressure in the passage 127 reach low values, the leakage in the passage 127 and connected valves is not sufficient to lower the fluid pressure in the passage 127 to correspond to the decreased governor speed, and in this case, the piston 117 moves inwardly with respect to the sleeve 116 to connect the port 124 and passage 128 by means of the groove 122. When a low pressure of fluid is reached in the passage 127 corresponding to the low governor speed, the governor piston 117 again moves outwardly to block escape of fluid from the port 124 and through the passage 128.

The net effect of the governor 79 is to provide a fluid pressure in its output conduit 127 that increases with governor speed, and for a particular installation, an illustration of this effect is shown in Fig. 15 which shows the relation between the pressure in passage 127 and the vehicle speed in second and third speed ratios at wide open throttle.

In the neutral condition of the transmission control system, which is illustrated in Fig. 8, the pump pressure which is supplied to the selector valve 200 by means of the conduit 219 is ineffective and is blocked off by means of the valve 200. The governor regulated fluid pressure in conduit 127 is supplied to the 2nd-3rd valve 230 and also to the low range lockout valve 316; however, since the selector valve 200 blocks off all pump pressure to the hydraulic system, this governor pressure is not effective in the neutral condition of the transmission and its controls to cause transmission ratio changes. In the neutral condition of the transmission, the sleeve 38 is in its neutral position in which it is illustrated in Fig. 1.

The transmission is conditioned for a forward drive in high range by moving the selector valve 200 to the right to its position as shown in Fig. 9 and by moving the clutch sleeve 38 to the left as seen in Fig. 1 into its "forward" position. The selector valve 200 in its high range position functions to connect the fluid supply conduit 219 with the conduits 217 and 220 by means of the ports 214 and 215. The conduit 217 supplies fluid under pressure to the ports 238 and 239 of the throttle valves 223 and 228 and the conduit 220 supplies fluid under pressure to the port 262 of the relay valve 248. Since the relay valve 248 remains in its original position in which it was shown in Fig. 8, fluid under pressure is supplied by means of the port 263 and the conduits 184a and 184 to the piston 165 by means of the port 185.

The fluid under pressure as supplied to the port 239 is metered by the regulator valve 228 to provide a pressure in conduits 244 and 245 which varies with the position of the accelerator 246 and with the opening of the vehicle engine throttle and which I have therefore designated as a throttle pressure. When the accelerator 246 is depressed, it acts through the linkage connecting it with the valve 223 to move the valve 223 to the right as seen in Fig. 9 and by means of the spring 235 to move the regulator valve 228 in the same direction. A movement of the valve 228 in this direction connects the port 239 with the port 240 by means of the groove 233 so as to supply fluid under pressure in the conduits 244 and 245. This fluid under pressure is applied to the land 231a through the port 241, and this fluid under pressure acts against the action of the spring 235 to return the valve 228 to its original position in which the land 231 blocks the port 240. Similarly, a further depression of the accelerator 246 functions to allow more fluid under pressure to enter the conduits 244 and 245, and the net result is the production of a throttle pressure in the conduits 244 and 245 which varies in accordance with the accelerator depression. The conduits 244 and 245 and the valves connected therewith allow a certain amount of leakage of fluid, and the valve 228 continues to reopen the port 240 or stays at a position slightly opening the port 240 so as to maintain the fluid pressure within the conduits 244 and 245 at the particular value which corresponds to the depression of the accelerator. This leakage is generally sufficient to cause the corresponding decrease in pressure in the conduits 244 and 245 associated with a relaxing of the accelerator 246.

The port 242 is an exhaust port which allows fluid from the conduits 244 and 245 to escape through the end of the cylinder 229 for the valve 228. As has been described, the leakage in the lines 244 and 245 is generally sufficient to cause a decrease in fluid pressure in these conduits when the accelerator is released; however, when the fluid pressure in the conduits 244 and 245 decreases to a very low value, then the leakage is not sufficient to completely reduce the fluid pressure in the lines 244 and 245, and the valve 228 moves to the left to open the port 242 and drain the fluid within the conduits 244 and 245 to the sump 97 through the port 242.

The regulator valve 228 is balanced between the spring 235 and the fluid pressure on the area 231a to provide a fluid throttle pressure in conduits 244 and 245 that increases with opening of the throttle and decreases with closing of the throttle. The manner in which the throttle pressure in the conduits 244 and 245 varies with the accelerator depression is shown for one installation of my improved hydraulic controls in Fig. 16 for a better understanding of the action of the valves 223 and 228.

With the relay valve 248 being in its position as illustrated in Fig. 9 the throttle pressure in conduit 245 flows through the ports 266 and 265 and the groove 257 to the conduit 182 and is thence applied to the piston 166. The throttle pressure applied on piston 166 and the pump pressure applied on piston 165 function to apply the brake 17 through the piston rods 173 and 167, the lever 186 and the strut 187. The brake 17 is thus applied to complete the second speed power train through the transmission between the shaft 10 and the shaft 11. Since the pump pressure in addition to the throttle pressure are used to apply the brake, the brake is applied by a pressure which varies with the accelerator depression, so that the greater the torque supplied by the vehicle engine which varies with the accelerator depression the greater braking power there is in connection with the brake 17, and this feature gives a smooth engagement of the brake and completion of the second speed power train regardless of the position of the throttle at the time. Preferably, the throttle is released when the manual valve 200 is shifted to its high range position, and in this case, it is only the regulated pump pressure applied to the piston 165 which is effective to engage the brake 17.

In the second speed condition of the system as shown in Fig. 9, the throttle pressure through the conduit 244 is applied to the 2nd–3rd valve 280 and particularly to the portion 283 and the portion 282 through the passage 315, as is apparent from the figure. The throttle pressure on this valve tends to shift it to the left as seen in the figure; however, since the valve is already at its extreme leftward position, this fluid pressure has no effect at this time A change into third speed forward drive automatically takes place when the governor pressure in the conduit 127 becomes sufficient to shift the 2nd–3rd valve 280 against the throttle pressure which is effective on the faces 294a and 299a of the lands 294 and 299 respectively. As shown in Fig. 10, the governor pressure is impressed on the faces 284a and 292a of the lands 284 and 292, respectively, being applied thereto through the ports 303 and 305, and when the governor pressure has increased sufficiently, the 2nd–3rd valve consisting of the three parts 281, 282 and 283 is moved to the right against the action of the throttle pressure on the faces 294a and 299a to its Fig. 10 position. It will be noted that the land 299 in the shifted position of the valve blocks the passage 315 so that the throttle pressure is effective only thereafter on the land 299a, and the fluid pressure formerly applied to land 294a is exhausted to the sump through the port 312, conduits 243, port 237, groove 227 in the valve 223, and exhaust port 236. The throttle pressure therefore is not as effective as formerly in exerting a force on the valve 280 toward the left.

Since the throttle pressure effective on the lands 299a and 294a increases with the depression of the accelerator 246, it follows that the change to third speed ratio occurs at higher vehicle speeds with a greater opening of the throttle. This is advantageous since a vehicle operator naturally opens the throttle farther when greater acceleration is desired, and a lower speed ratio will generally provide greater acceleration.

The 2nd–3rd valve 280 in its third speed position as it is shown in Fig. 10 connects the conduit 184b, which carries a supply of pump pressure from the relay valve 248, to the conduits 310 and 183 by means of the ports 308 and 307 and the groove 295. Regulated pump pressure is thus applied to the piston 66 for engaging friction clutch 18.

The fluid pressure in the conduit 183 is applied to the face 164a of the piston 164 and, through the ports 171 and 172 and the passage 170 and the ports 177, is applied also to the face 166b of the piston 166. The total force on the pistons 164 and 166 is sufficient to move the piston rods 167 and 173 back into their original brake disengaged positions, against the actions of the pressures shown in Fig. 9 tending to engage the brake 17, to disengage the brake 17. The transmission is now in high speed drive.

It will be noted that the orifice 330 is in the conduit 184b which supplies the pump regulated fluid pressure to the valve 280 for engaging the clutch 18 and disengaging the brake 17. This orifice is for the purpose of slowing the engagement of the clutch and disengagement of the brake in order to give a smooth upshift into direct drive. A further noteworthy feature of the 2nd-3rd ratio changing mechanism is the fact that the face 293a of the land 293 is of slightly larger diameter than the face 292b of the land 292. The pump regulated fluid pressure when in contact with both of these faces in the third speed position of the 2nd-3rd valve 280 thus has the effect of providing an additional force for holding the 2nd-3rd valve 280 in its high speed position. As has been above explained, the throttle pressure is not effective on the face 294a of the land 294 in the third speed position of the valve 280, and the force on the valve 280 from the governor is thus relatively greater with respect to the force on the valve from the throttle pressure than before, and the effect of this also is to hold the valve 280 in its third speed position. As is apparent from Fig. 15, the regulated governor pressure in third speed ratio for the same vehicle speed is less than in second speed ratio, and there is a danger of the valve 280 after having shifted into the third speed position of returning immediately into the second speed position, in other words "hunting" between the two positions, and the arrangements just mentioned insure that no such "hunting" can take place.

A downshift from third speed ratio to second speed ratio is forced when the accelerator 246 is moved into its detent position at fully open throttle against the action of the mechanism 247. In the detent position of the accelerator, the valve 223 is moved to bring its groove 227 to connect the ports 237 and 238 for thereby connecting the conduit 217 which carries a supply of fluid under regulated pump pressure with the conduit 243. This condition is shown in Fig. 11. The fluid under pressure in conduit 243 is applied to the land faces 299b, 294a, 294b and 293b, and the resultant is a force which when combined with that of the compression spring 298 is sufficient to move the 2nd-3rd valve 280 back to its second speed position. As in second speed hereinbefore described, the clutch 18 is disengaged and the brake 17 is engaged, the pressure conduit 310 for the clutch piston 66 and the pressure conduit 183 for the brake disengaging pistons 164 and 166 both being drained through the exhaust port 306. The valve 223 with its groove 227 thus provides a forced downshift under the control of the accelerator 246 and thereby under the control of the vehicle operator at times when the vehicle would otherwise be travelling in third speed ratio. The throttle pressure acting on the valve 280 would otherwise also provide a downshift from third speed ratio to second speed ratio; however, this would not occur at full throttle until a relatively slow vehicle speed was reached, for example, 25 miles per hour. Using this feature including the valve 223 for applying regulated pump pressure to the faces 293b, 294b, 294a and 299b, a downshift may selectively be had in a 65 M. P. H. to 25 M. P. H. speed range, for example.

In order to complete the low speed power train through the transmission and condition the hydraulic system for low range, the selector valve 200 is shifted into its low range position as is indicated in Fig. 12. In this position of the valve 200, the pressure conduit 219 is connected with the port 213 and thereby with the conduit 218 by means of the groove 207. Fluid under pressure in the conduit 218 acts on the land end 319a of the valve 316 to move the valve to the right as seen in the figure against the action of the spring 324. The piston 323 when so shifted connects the ports 327 and 328 by means of the groove 321 so as to connect the conduit 218 with the conduit 152b which supplies fluid pressure both to the relay valve 248 and also to the piston 139 in the servomotor 70. The fluid pressure is applied to the face 139a of the piston 139 and functions to move the piston against the action of the springs 144 and 147.

The fluid under pressure in the conduit 152 is applied to the face 251a of the land 251 and functions to move the relay valve 248 to the right as seen in the figure against the action of the spring 260. Throttle pressure is present in the conduit 245 as in high range condition of the hydraulic system, and the relay valve 248 in its shifted position connects the ports 266 and 267 by means of the groove 257 so that fluid from the conduit 245 is supplied to the conduit 153. The conduit 153 is connected with the piston 140 to apply the fluid pressure in the conduit which is the throttle pressure to the face 140a of the piston. The regulated pump pressure on the piston 139 plus the throttle pressure on the piston 140 are thus effective to move the piston rod 141 into a brake engaging position, and the brake 16 is engaged by means of the lever 149 and strut 150. The transmission is then in low speed drive. In this speed ratio also, it will be noted, the regulated throttle pressure is utilized for engaging a friction engaging element, namely the brake 16, for completing the drive.

It will be noted that an orifice 331 is provided in the conduit 218. This is for the purpose of providing a relatively slow, controlled, movement of the piston 139 after the pressure in the conduit 218 has been effective to move the low range lockout valve 316 into its illustrated position, and the action of the piston 139 is further cushioned by means of the spring 144 disposed between the piston and the spring retainer 145 which is fixed with respect to the piston rod 141. Regulated pump pressure is also present in the conduit 220 as in high range; however, the land 251 of the relay valve 248 functions in the shifted position of the relay valve 248 to block the port 262 of the conduit 220 as is seen in Fig. 12. It will be apparent that the relay valve 248 functions, in addition to closing the conduit 220, to effectively shift the throttle pressure from the piston 166 in the servomotor 69 to the piston 140 in the servomotor 70. The brake releasing pressure applied to the pistons 164 and 166 in the servomotor 69 is obtained from the 2nd-3rd valve and the conduit 220, which also supplies the piston 165 with brake engaging pressure, and since the relay valve blocks the conduit 220, there can be no fluid under pressure supplied to the conduits 183 and 310 for changing speed ratio into direct drive, regardless of the position of the 2nd-3rd valve.

It will be noted that the surfaces 319a and 320a on the valve 316 are of unequal diameter, and this is for the purpose of providing a holding force for the valve 316 when fluid pressure is supplied through the groove 321 to the conduit 152b. As will be noted, the governor regulated pressure from the conduit 127 is applied at the right end of the valve 316 to assist the spring 324 in moving the piston. The purpose in supplying the governor pressure to this end of the valve and in fact the principal purpose of the valve 316 itself is to prevent a change from high range to low range above a certain vehicle speed, for example, 35 M. P. H. Above this speed, the effect of the governor pressure on the right hand end of the valve 316 is sufficient so that even if the selector valve 200 is moved to its low range position, the pump pressure in the conduit 218 applied on the left end of the valve 316 is not sufficient to move said valve to the right into its position in which it is shown in Fig. 12. However, due to the effect of the fluid pressure on the faces 319a and 320a, when a drive is completed through the transmission in its low range, a movement of the lockout valve 316 to the left under the influence of the governor pressure in the conduit 127 is prevented until some higher speed of the vehicle is attained.

One of the principal purposes of the relay valve 248 is to provide a suitable overlap or simultaneous partial engagement of the friction engaging elements 17 and 18 for either of the high range power trains and the friction brake 16 for the low range first speed power train on a change of the transmission from high range to low range, or vice versa, by means of the manual selector valve 200. As will be noted from an inspection of Fig. 8 and subsequent figures of the drawings, a change into low range from neutral condition of the transmission is obtained only by moving the selector valve 200 through its high range position so changes between low and high range are common.

As has been described, in changing into low range from high range by means of the selector valve 200, the pressure on the face 251a of the valve 248 and on the face 139a of the piston 139 increases in the same manner, as both of these faces are connected with the conduit 152, and the rate of increase in pressure in this latter conduit is controlled by means of the orifice 331. Assuming that the accelerator is in its throttle closing position when the change in speed ratio is made, the spring 260 functions to yieldably hold the relay valve 248 from moving from its high range position as it is, for example, shown in Fig. 9 to its low range position as it is shown in Fig. 12. Therefore, a predetermined increase in pressure in the conduits 152, 152a and 152b which is impressed on the piston faces 251a and 139a must take place before the relay valve 248 moves against the action of the spring 260 into its low range position as it is illustrated in Fig. 12. The effect of this is to maintain the pump pressure impressed on the piston 165, in a change from second speed ratio to first speed ratio for example (see Fig. 9), through the conduits 184, 184a and 220 for maintaining a full engagement of the second speed brake 17 until a predetermined partial engagement of the low speed brake 16 corresponds to a predetermined critical pressure in the conduit 152 is attained. Upon this fluid pressure in the conduit 152 being reached, the relay valve 248 moves against the action of the spring 260 into its low range position illustrated in Fig. 12, and thereupon the conduit 184 supplying regulated pump pressure to the piston 165 in the motor 69 is cut off from its supply conduit 220 and is drained to the sump through the port 264. Thus the relay valve 248 has the effect of maintaining the brake 17 applied a predetermined time after application of the first speed brake 16 is begun to produce an overlap between engagements of the brakes 16 and 17.

The action of the relay valve 248 just described in giving an overlap between brakes 16 and 17 on a change in speed ratio from intermediate to first speed ratio is modified by the throttle pressure in the conduit 245 when this change is made with the accelerator in open or partially open throttle position. As may be seen from an examination of Fig. 9, the relay valve 248 in its high range position has the throttle pressure from the conduit 245 impressed on both the valve face 253a and also the valve face 254a. The valve face 253a is somewhat larger than the valve face 254a, and, therefore, throttle pressure from the conduit 245 impressed on these valve faces has the effect of providing a force tending to move the valve 248 to the left as seen in the figure to augment the action of the spring 260. Due to this force augmenting the action of the spring 260, the relay valve 248 is not moved from its high range position as it is illustrated in Fig. 9, for example, to its low range position illustrated in Fig. 12 until the fluid pressure in the conduits 152, 152a and 152b increases to a higher value, corresponding to a greater brake applying pressure on the brake 16. This action of the relay valve 248 thus gives a greater overlap of engagement to the high range and low range brakes 17 and 16 with opening of the throttle. As has been described, movement of the valve 248 to its low range position illustrated in Fig. 12 has the effect of not only blocking the conduit 220 which supplies the engaging pressures for second and third speeds but also transfers the throttle pressure in the conduit 245 from the piston 166 in the motor 69 to the piston 140 in the motor 70.

In changing from low range to high range and intermediate speed, for example, assuming the accelerator is in a throttle released position, the relay valve 248 will move from its Fig. 9 position to its Fig. 12 position at about the same fluid pressure on the piston face 139a and the same corresponding engagement of the brake 16 as that at which the valve 248 moved in the opposite direction for a change in speed range. Thus the brake 16 is partially disengaged to a predetermined extent before engagement of the brake 17 is initiated.

Assuming that the selector valve 200 is moved from its low range position to its high range position with the accelerator 246 partially depressed, this movement of the relay valve 248 to the left as seen in the figures will take place at a greater value of fluid pressure in the conduit 152 and associated conduits than with no accelerator depression, since the throttle pressure in the conduit 245 has the effect of providing a force tending to move the valve 248 to the left. Thus, when the throttle is opened or partially opened, engagement of the second speed brake 17 is initiated sooner after disengagement of the brake 16 is begun with a decline in fluid pressure in the conduit 152, and the overlap of engagement of the brake 17 on brake 16 is made greater.

Ratio changing by means of the manual selector valve 200 between high range third speed ratio and low range first speed ratio is very similar to that just described between high range intermediate speed ratio and low range first speed ratio with the exception that the clutch 18 is engaged and disengaged instead of the brake 17. There is substantially one noteworthy difference, however, and this is due to the fact that throttle pressure is not applied to the piston 66 for the clutch 18 as it is to the piston 166 in the brake motor 69 for changing engagement depending on the throttle depression.

It is noteworthy that the hydraulic system is so arranged that the engagement of brake 17 or clutch 18 is initiated by a movement of the relay valve 248 during a change from low range to high range at a greater degree of engagement of the brake 16 than that at which disengagement of the brake 17 or clutch 18 is initiated by a movement of the relay valve 248 during a change from high range to low range, assuming the throttle is at least partially open and has the same opening in both cases. This is due to the action of the throttle pressure effective on the piston 140 when the transmission is in low speed ratio and which augments the action of the pump pressure in the conduit 152 impressed on the piston 139 and which throttle pressure in the high range condition of the control mechanism is impressed instead on the piston 166 in the brake motor 69. In other words, the throttle pressure is impressed on the piston 140 in the motor 70 while the pressure in the conduit 152 is decreasing to cause a movement of the relay valve 248 into its high range position but is not impressed on this piston while the pressure in the conduit 152 is increasing to cause a movement of the relay valve 248 into its low range position. The purpose of this feature is to cause an earlier engagement of the brake 17 and clutch 18 relative to the decline in actual engaging force on the brake 16, depending on the position of the accelerator, in changing to high range, since in making the change from low range to high range, the vehicle engine is decreased in speed due to the engagement of the particular engaging means being utilized to complete the high range and which must, therefore, do more work in completely engaging.

The purpose and advantage of the relay valve thus is to effect the proper overlap between the friction engaging elements for completing the low and high range drives which is modified to varied torque loads on the vehicle engine by the fluid throttle pressures, and the relay valve permits smooth ratio changes without engine runaway for all conditions of throttle opening.

For reverse drive, as has been explained, the shiftable sleeve 38 is moved into its "reverse" position which is indicated in Fig. 1 for conditioning the gear set for this drive. The selector valve 200 is moved into its reverse position also (see Fig. 13). In this position, regulated pump pressure is supplied to the conduits 217 and 218 for engaging the rear brake 16 in substantially the same manner as for the drive in low range. In this case, however, the fluid under pressure is supplied from the conduit 219 through the groove 208 and port 213 to the conduit 218 and from thence to the port 211 and groove 207 to the conduit 217. No pressure is supplied to the conduit 220 in this position of the valve 200; however, fluid in this conduit was not effective anyway in low range drive since the land 251 of the relay valve 248 blocked its port 262.

A noteworthy feature of the invention lies in the use of the differential gearing, including the gears 78, 76, and 75, for driving the pump 71 which supplies fluid pressure for the torque converter 13, the friction brakes 16 and 17, and the friction clutch 18. The differential gearing is such that either the drive shaft 10 or driven shaft 11 may drive the pump, and if the vehicle engine is inoperative, the necessary fluid pressure may be provided for completing a drive through the transmission by rotating the driven shaft, as by pushing or towing the vehicle, even though only one pump is used.

I wish it to be understood that my invention is not to be limited to the specific constructions and arrangements shown and described, except only insofar as the claims may be so limited, as it will be understood by those skilled in the art that changes may be made without departing from the principles of the invention.

I claim:

1. In transmission mechanism for an automotive vehicle, the combination of an accelerator for the vehicle, a drive shaft, a driven shaft, means providing low, intermediate and high speed power trains between said shafts, said intermediate and high speed power trains each having friction engaging means for completing the power train, a control adapted for operation by the vehicle operator and having a low range and a high range position, means connected with said control for completing said low speed power train between said shafts when said control is in its low range position, means connected with said control for completing said intermediate or high speed power trains between said shafts by engagement of said friction engaging means and exclusive of said low speed power train when said control is in its high range position, and means for automatically changing the transmission between said intermediate and high ratios when said control is in its high range position, said last-named means including a governor responsive to the speed of said driven shaft, a valve having two positions and adapted in one position to complete said intermediate speed power train and in the other position to complete said high speed power train, fluid pressure means under control of said governor for providing a fluid pressure that varies in accordance with governor speed, fluid pressure means under the control of said accelerator for providing a fluid pressure that varies with the position of the accelerator, and fluid conducting means for applying one of said fluid pressures on one side of said valve tending to move the valve into one of its said positions and for applying the other of said fluid pressures on the other side of said valve tending to move the valve into the other of its said positions.

2. In transmission mechanism for an automotive vehicle, the combination of a drive shaft, a driven shaft, means providing a low and a high speed power train between said shafts and including fluid pressure responsive means for completing said power trains, a source of fluid pressure for said fluid pressure responsive means, a selector valve having low and high speed positions and connected between said fluid pressure source and said fluid pressure responsive means for causing a change of the transmission between its speed ratios, a governor driven by said driven shaft, fluid pressure means actuated by said governor and providing a fluid pressure which varies with the speed of rotation of said governor, a low speed lockout valve connected with said last-named fluid pressure means, said last-named valve having two positions in one of which it provides said low speed drive and in the other of which it breaks said low speed drive, said valve being connected with said first-named valve so as to be moved by fluid pressure from the first-named valve when this valve is put into its low speed position, said lockout valve being connected with said governor regulated fluid pressure which functions to move said valve into its drive breaking position and hold it in this position above a predetermined speed of said driven shaft, said lockout valve including unbalanced areas subject to fluid pressure when the valve is in its low speed drive position which tend to hold the valve in this position.

3. In transmission mechanism for an automotive vehicle, the combination of a drive shaft, a driven shaft, means providing relatively low and high speed power trains between said shafts, a friction clutch for completing said high speed power train and a friction brake for completing said low speed power train, fluid pressure actuated motors for engaging each of said clutch and brake, a source of fluid pressure, an accelerator, valve means connected with said accelerator and said fluid source for providing a throttle pressure that varies in accordance with accelerator position, a hydraulic governor driven by said driven shaft and connected with said fluid source and providing a fluid pressure that varies in accordance with the governor speed, a shiftable valve in one position connecting said fluid pressure source with one of said motors and in the other position connecting said source with the other motor, means applying said throttle pressure on one end of said shiftable valve and said governor pressure on the other end of said shiftable valve, and means for applying said throttle pressure also on said brake motor for providing a brake application pressure that varies in accordance with the position of the accelerator.

4. In transmission mechanism for an automotive vehicle, the combination of a drive shaft, a driven shaft, means for providing relatively low and high speed power trains between said shafts and including a friction engaging means for completing each of said power trains, a fluid pressure responsive motor for engaging each of said friction engaging means, spring means for maintaining said motor inoperative to engage said friction engaging means when no fluid pressure is applied to the motors, means including a pump providing a fluid pressure, valve means for connecting said pump pressure and either of said motors for engaging the respective engaging means to complete said power trains, an accelerator for the vehicle, valve means connected with said fluid source and controlled by said accelerator for providing a fluid throttle pressure which varies with the accelerator position, and means for connecting said throttle pressure with either of said motors along with said pump pressure for providing an additional force for engaging the respective friction engaging means.

5. In transmission mechanism for an automotive vehicle, means providing relatively low and high speed power trains between said shafts, each of said power trains including a friction brake which when engaged completes the power train, a fluid pressure motor for engaging each of said brakes, a source of fluid pressure including a pump, spring means for holding said motors inoperative for applying said brakes when no fluid pressure is applied to the motors, valve means for connecting said pump pressure with either of said motors for providing a brake engaging force by means of the motors, an accelerator for the vehicle, valve means under the control of said accelerator and connected with said pump for providing a throttle pressure that varies in accordance with the accelerator position, and valve means for applying said throttle pressure to said motors along with the pump pressure for providing an increased brake engaging force for each of the brakes.

6. In transmission mechanism for an automotive vehicle, the combination of a drive shaft, a driven shaft, a source of fluid pressure, a hydraulic governor connected with said pressure source and having a pressure output that varies with governor speed, differential gearing for driving said governor in accordance with the speeds of both the drive and driven shafts, means providing low and high speed ratios between said shafts, means for changing the transmission between said speed ratios and including a shiftable valve responsive to the output pressure of said governor to be shifted from a low speed position thereof to a high speed position on an increase in governor pressure, and means for yieldably maintaining said shiftable valve in its high speed position after a shift thereof responsive to an increase of governor pressure whereby the decrease in governor pressure with a decrease in speed of said drive shaft on such a change in speed ratio will not cause the shiftable valve to return to its original position.

7. In a transmission for an automotive vehicle, the combination of a drive shaft, a driven shaft, a source of fluid pressure, a hydraulic governor connected with said pressure source and providing a governor pressure that varies in accordance with the speed of the governor, differential gearing for driving said governor in accordance with the speeds of both of said shafts, means for providing a low and a high speed ratio between said shafts, means for changing the transmission from its low to its high ratio and including a shiftable valve having a position corresponding to each of the speed ratios and connected with said governor pressure so that the pressure tends to shift the valve to its high ratio position, and means for yieldably holding said valve in its high ratio position and including stepped areas on said valve of different diameter and having fluid pressure applied to them when the valve is in its high ratio position.

8. In a transmission, the combination of a drive shaft, a driven shaft, a source of fluid pressure, a hydraulic governor connected with said pressure source and providing a governor pressure that varies in accordance with the governor speed, differential gearing for driving said governor in accordance with both the speeds of said drive and driven shafts, means providing a low and a high speed ratio between said shafts and including fluid pressure responsive means for completing the high speed ratio, a shiftable valve for causing a change from said low to said high ratio and connecting said fluid pressure responsive means with said fluid pressure source in its high ratio position, said valve being connected with said governor pressure which tends to shift it to its high ratio position, and means for yieldably holding the shiftable valve in its high ratio position and including stepped areas on the valve of different diameter in communication with the fluid pressure applied to said fluid pressure responsive means.

9. In a transmission, the combination of a drive shaft, a driven shaft, means providing relatively low and high speed ratios between said shafts, a source of fluid pressure, a governor connected with said source and driven by said driven shaft and providing a governor pressure that varies with the speed of the governor, an accelerator for the vehicle, valve means connected with said accelerator for providing a throttle pressure that varies in accordance with the opening of the vehicle throttle, means for changing the transmission from its low to its high ratio and including a shiftable valve having low speed and high speed positions, said valve being connected both with said governor pressure and with said throttle pressure which tend to shift the valve in opposite directions, the governor pressure tending to shift the valve from its low speed to its high speed position, and means connected with said accelerator valve for connecting said pressure source with said shiftable valve when the accelerator is moved to an open throttle position for moving the shift valve from its high speed position to its low speed position even if the throttle pressure in comparison with the governor pressure is not sufficient for so shifting the shiftable valve.

10. In a transmission, the combination of a drive shaft, a driven shaft, means for providing a low speed power train between said shafts, means for providing a high speed power train between said shafts, each of said means including a fluid pressure operated friction engaging means for completing the respective power train when engaged, means including a valve for applying fluid pressure to engage one of said friction means in one position of the valve and for releasing the fluid pressure to disengage the friction means in another position of the valve, means including a selector valve for selectively applying pressure to the other of said friction means for engaging and disengaging the latter friction means, and means hydraulically connecting said last-named friction means and said first named valve so as to actuate said first named valve at transitory fluid pressures on said last-named friction means less than the full engaging pressure therefor.

11. In a transmission, the combination of a drive shaft, a driven shaft, means for providing a low speed power train between said shafts, means for providing a high speed power train between said shafts, each of said means including a fluid pressure actuated friction engaging means for completing the respective power train when engaged, a source of fluid pressure, a valve for connecting a first one of said friction engaging means with said pressure source in one position of the valve and for disconnecting the source and engaging means in another position thereof, valve means for selectively connecting the second one of said friction engaging means with said pressure source, means for hydraulically connecting said second friction engaging means with said valve for actuating the valve, and means biasing said valve in one direction of its movement whereby the valve is actuated by changes in fluid pressure on said second friction engaging means at partial engagement thereof whereby engagements and disengagements of said first friction engaging means are initiated at partial engagements and disengagements of said second friction means.

12. In a transmission, the combination of a drive shaft, a driven shaft, means for providing a low speed power train between said shafts and including a friction engaging means for completing the power train, means for providing a high speed power train between said shafts and including a friction engaging means for completing the power train, means for initiating the engagement of one of said friction means at the time the other friction means has been partially disengaged during the course of disengagement thereof, and means cooperating with said engagement initiating means for selectively changing the time of engagement initiation to a different partial disengagement of said other friction means.

13. In a transmission for an automotive vehicle, the combination of a drive shaft, a driven shaft, a throttle for the vehicle, means providing a low speed power train between said shafts and including a friction engaging means for completing the power train, means for providing a high speed power train between said shafts and including a friction engaging means for completing the latter power train, means for initiating the engagement of a first one of said friction means at the time the second one of said friction means has been partially disengaged during the course of disengagement of the latter friction means, and means under the control of said throttle for changing the time of initiation of engagement of said first friction means with a greater throttle opening closer to the full engagement point of said second friction means.

14. In a transmission for an automotive vehicle, the combination of a drive shaft, a driven shaft, means for providing a low speed power train between said shafts and including a friction engaging means for completing the power train, means for providing a high speed power train between said shafts and including a friction engaging means for completing the power train, an accelerator for the vehicle, means for initiating the engagement and disengagement of a first one of said friction engaging means when the second one of said engaging means is being respectively disengaged and engaged and at partial engagements of the latter engaging means, and means under the control of the accelerator for controlling the initiation of engagement and disengagement of said first friction means to be at points of greater engagement of said second friction means when the accelerator is in a throttle opening position.

15. In a transmission for an automotive vehicle, the combination of a drive shaft, a driven shaft, means for providing a low speed power train between said shafts and including a fluid pressure engaged friction engaging means for completing the power train, means providing a high speed power train between said shafts and including a fluid pressure engaged friction engaging means for completing the power train, an accelerator for the vehicle, means for controlling a first one of said friction engaging means and including a valve having a position for applying fluid pressure to said friction engaging means and another position for cutting the application of such fluid pressure, hydraulic means for applying a fluid pressure to the second of said friction engaging means for operating it, means connecting hydraulically said second friction engaging means and said valve so as to tend to move the valve by the fluid pressure applied to the friction means, spring biasing means operating on said valve whereby the valve is moved at a fluid pressure corresponding to partial engagement of said second friction means, and other biasing means operating on said valve and actuated by said accelerator for increasing the said fluid pressures at which said valve is operated when the accelerator is in a position opening the vehicle throttle.

16. In a transmission for an automotive vehicle, the combination of a drive shaft, a driven shaft, means for providing a low speed power train between said shafts and including a fluid pressure engaged friction engaging means for completing the power train, means providing a high speed power train between said shafts and including a fluid pressure engaged friction engaging means for completing the power train, an accelerator for the vehicle, means for controlling a first one of said friction engaging means and including a valve having a position for applying fluid pressure to said friction engaging means and another position for cutting the application of such fluid pressure, hydraulic means for applying a fluid pressure to the second of said friction engaging means for operating it, means connecting hydraulically said second friction engaging means and said valve so as to tend to move the valve by the fluid pressure applied to the friction means, spring biasing means operating on said valve whereby the valve is moved at a fluid pressure corresponding to partial engagement of said second friction means, and hydraulic means under the control of said accelerator for applying a variable fluid pressure to said valve tending to move the valve whereby the valve is moved at higher partial engaging fluid pressures for said second friction means depending on the degree of vehicle throttle opening.

17. In a transmission, the combination of a drive shaft, a driven shaft, means for providing a low speed power train between said shafts and including a fluid pressure engaged friction engaging means for completing the power train, means for providing a high speed power train between said shafts and including a fluid pressure engaged friction engaging means for completing the power train, a source of fluid pressure, a selector valve for selectively connecting said pressure source with a first one of said friction engaging means for engaging the means, a relay valve for connecting the second one of said friction engaging means with said fluid pressure source in one position and disconnecting the pressure source and friction means in another position thereof, means connecting said relay valve with said first friction engaging means so that fluid pressure operative on the latter means is effective to shift the valve, spring means biasing said relay valve in one of its positions whereby the valve is shifted at fluid pressures partially engaging said first friction means to initiate engagement of said second friction means, and valve means under the control of said accelerator for applying a variable fluid pressure to said relay valve depending on the degree of throttle opening for augmenting the action of said spring means to cause a shifting of the relay valve at higher fluid pressures applied on said first-named friction engaging means for increasing the overlap of engagement between the two friction engaging means.

18. In a transmission for an automotive vehicle, the combination of a drive shaft, a driven shaft, means for providing a low speed power train between said shafts and including a friction engaging means for completing the power train, means for providing a high speed power train between said shafts and including a friction engaging means for completing the power train, means for initiating the engagement and disengagement of said high speed friction engaging means on respective disengagement and engagement of said low speed friction engaging means and at partial engaging pressures of the latter engaging means, and means for causing the initiation of engagement of said high speed friction engaging means at a higher engaging pressure of the low speed engaging means than the partial engaging pressure of the low speed friction engaging means at which disengagement of said high speed engaging means is initiated.

19. In a transmission for an automotive vehicle, the combination of a drive shaft, a driven shaft, means for providing a low speed power train between said shafts and including a friction engaging means for completing the power train, means for providing a high speed power train between said shafts, and including a friction engaging means for completing the power train, means for initiating the engagement of the high speed engaging means at a partial engaging pressure of said low speed engaging means and for initiating disengagement of said high speed engaging means at a partial engaging pressure of said low speed engaging means, a throttle control for the vehicle, and means under the control of said throttle control for causing an engagement of said high speed engaging means at a progressively higher pressure of said low speed engaging means depending on the degree of throttle opening.

20. In a transmission for an automotive vehicle, the combination of a drive shaft, a driven shaft, means for providing a low speed power train between said shafts and including a fluid pressure operated friction engaging means, means for providing a high speed power train between said shafts and including a fluid pressure operated friction engaging means, a source of fluid pressure, a selector valve for selectively applying fluid pressure to said low speed engaging means, a relay valve for applying fluid pressure to said high speed engaging means in a first position thereof and disapplying said fluid pressure in a second position thereof, means hydraulically connecting said low speed engaging means and said relay valve for shifting the valve to disapply fluid pressure to said high speed engaging means when the fluid pressure is applied to the low speed engaging means, means biasing said relay valve whereby the relay valve is moved at partial engaging pressures of said low speed engaging means, and means connected with said relay valve for applying a fluid pressure to said low speed ratio engaging means when the relay valve is in its said second position whereby the partial engagement of said low speed ratio engaging means at which said relay valve moves to initiate engagement of said high speed ratio engaging means is higher than the partial engaging pressure of the low speed engaging means at which the relay valve is actuated to disengage the high speed engaging means.

21. In a transmission for an automotive vehicle, the combination of a drive shaft, a driven shaft, means for providing a low speed power train between said shafts and including a fluid pressure operated friction engaging means, means for providing a high speed power train between said shafts and including a fluid pressure operated friction engaging means, a source of fluid pressure, a selector valve for selectively applying fluid pressure to said low speed engaging means, a relay valve for applying fluid pressure to said high speed engaging means in a first position thereof and disapplying said fluid pressure in a second position thereof, means hydraulically connecting said low speed engaging means and said relay valve for shifting the valve to disapply fluid pressure to said high speed engaging means when the fluid pressure is applied to the low speed engaging means, means biasing said relay valve whereby the relay valve is moved at partial engaging pressures of said low speed engaging means, an accelerator for the vehicle, valve means connected with said fluid source and under the control of said accelerator for supplying a fluid pressure which increases with throttle opening, means connecting said accelerator controlled valve means, said relay valve and said friction engaging means so that in its said second position the relay valve applies said throttle variable fluid pressure to said low speed engaging means and in its other position the relay valve applies said throttle variable pressure to said high speed ratio engaging means tending to engage the means, whereby said relay valve is moved to its said first position at a higher engaging pressure of said low speed ratio engaging means with an open throttle than the engaging pressure of said low speed ratio engaging means at which the relay valve is moved in the opposite direction to disengage the high speed ratio engaging means.

22. In a transmission for an automotive vehicle, the combination of a drive shaft, a driven shaft, means for providing a low speed power train between said shafts and including a fluid pressure actuated friction engaging means for completing the power train, means for providing a high speed power train between said shafts and including a fluid pressure actuated friction engaging means for completing the power train, a source of fluid pressure, a selector valve for selectively connecting said pressure source with said low speed friction means for engaging the means, a relay valve in a first position thereof for selectively connecting said pressure source with said high speed engaging means and in a second position disconnecting said pressure source and said high speed engaging means, means hydraulically connecting said relay valve and said low speed ratio engaging means for shifting the relay valve, spring means biasing the relay valve so that the relay valve operates at partial fluid engaging pressure on said low ratio engaging means, an accelerator for the vehicle, valve means connected with said fluid source and with said accelerator for providing a throttle pressure increasing with throttle opening, means connecting said accelerator controlled valve means, said relay valve and said friction engaging means whereby the relay valve in its second position applies said throttle pressure to said low ratio engaging means and in its said first position applies said throttle pressure to said high ratio engaging means tending to further engage both engaging means, whereby the relay valve is moved by the fluid applied to said low speed engaging means at a higher partial engaging pressure of the low speed engaging means when the low ratio engaging means is being disengaged than the partial engaging pressure of the low ratio engaging means when the low ratio engaging means is being engaged, and lands of unequal diameter formed on said relay valve and in communication with said throttle pressure for augmenting the action of said spring means for increasing the values of the fluid pressure applied to said low ratio engaging means at which the relay valve moves.

23. In a transmission, the combination of a drive shaft, a driven shaft, means for providing two different power trains between said shafts, each of said trains including a fluid pressure operated means for completing the respective power train, means including a valve for applying fluid pressure to actuate a first one of said power train completing means in one position of the valve and for releasing the fluid pressure to deactuate the said first power train completing means in a second position of the valve, means for selectively applying pressure to the second of said power train completing means for actuating and deactuating this power train completing means, and means hydraulically connecting said second power train completing means and said valve so as to actuate said valve at transitory fluid pressures on said second power train completing means less than the full pressure applied thereto.

24. In a transmission, the combination of a drive shaft, a driven shaft, means for providing a low speed power train between said shafts, means for providing a high speed power train between said shafts, each of said means including a fluid pressure operated power train completing means, means for applying fluid pressure to a first one of said power train completing means and including a valve opening the fluid pressure to the power train completing means in one position and blocking the fluid pressure in another position, means for selectively applying pressure to the second one of said power train completing means, and means hydraulically connecting said valve in parallel with said second power train completing means so as to move said valve from one of its positions to the other as the pressure applied to said second power train completing means increases.

25. In a transmission, the combination of a drive shaft, a driven shaft, means for providing a low speed power train between said shafts, means for providing a high speed power train between said shafts, each of said means including a fluid pressure engaged friction engaging means for completing the respective power train when engaged, means for applying fluid pressure to a first one of said friction engaging means and including a valve opening the fluid pressure to the friction engaging means in one position and blocking the fluid pressure to the friction engaging means in a second position, means for selectively applying pressure to the second one of said friction engaging means, and means hydraulically connecting said valve with said second friction engaging means so as to move said valve from its first position to its second position as the pressure applied to said second friction engaging means increases.

26. In a transmission, the combination of a drive shaft, a driven shaft, means for providing a low speed power train between said shafts, means for providing a high speed power train between said shafts, each of said means including a fluid pressure engaged friction engaging means for completing the respective power train when engaged, means for applying fluid pressure to said high speed friction engaging means and including a valve opening the fluid pressure to the high speed friction engaging means in a first position and blocking the fluid pressure to the high speed friction engaging means in a second position, means for selectively applying pressure to said low speed friction engaging means, and means hydraulically connecting said valve with said low speed friction engaging means so as to move said valve from its first position to its second position as the pressure applied to said low speed friction engaging means increases.

27. In a transmission, the combination of a drive shaft, a driven shaft, means for providing a low speed power train between said shafts, means for providing a high speed power train between said shafts, each of said means including a fluid pressure operated power train completing means, means including a valve for applying fluid pressure to a first one of said power train completing means in a first position of the valve and for blocking such fluid pressure in a second position of the valve, means for selectively applying fluid pressure to the second of said power train completing means, said valve having two opposed pressure faces a first one of which is effectively smaller than the other and has a pressure on said first power train completing means applied thereto, and means hydraulically connecting said second power train completing means and said other valve face so that said valve is moved by the pressure applied to said second power train completing means against the pressure applied on said first named valve face as the pressure applied to said second power train completing means increases whereby for rendering said first power train completing means inoperative as said second power train completing means becomes operative.

28. In a transmission for a motor vehicle having an accelerator for controlling the speed of the vehicle, the combination of a drive shaft, a driven shaft, means for providing two different power trains between said shafts, each of said power trains including a fluid pressure engaged friction engaging means for completing the respective power train when engaged, means for applying a fluid pressure to a first one of said friction engaging means and including a valve for passing such fluid pressure in a first position and for blocking the fluid pressure in a second position, means for providing a fluid pressure that increases with the movement of said accelerator toward an open throttle position, said valve having two opposed faces one of which is subject to the fluid pressure as varied by said accelerator which tends to hold the valve in its said first position, and means for applying fluid pressure to the other face of said valve and to said second friction engaging means whereby said valve is moved from its first to its second position when the pressure on said second friction engaging means reaches a predetermined pressure variable with accelerator position.

29. In a transmission for a motor vehicle having an accelerator for controlling the speed of the vehicle, the combination of a drive shaft, a driven shaft, means for providing a low speed power train between said shafts, means for providing a high speed power train between said shafts, each of said means including a fluid pressure engaged friction engaging means for completing the respective power train when engaged, means for applying a fluid pressure to said high speed friction engaging means and including a valve for passing such fluid pressure in a first position and for blocking the fluid pressure in a second position, means for providing a fluid pressure that increases with the movement of said accelerator toward an open throttle position and supplied through said valve to said high speed friction engaging means, said valve having two opposed faces one of which is subject to the fluid as varied by said accelerator which tends to hold the valve in its said first position, and means for applying fluid pressure to the other face of said valve and to said low speed friction engaging means whereby said valve is moved from its first position to its second position when the pressure on said low speed friction engaging means reaches a predetermined pressure variable with accelerator position.

30. In transmission mechanism for an automotive vehicle, the combination of a drive shaft, a driven shaft, means providing low and high speed power trains between said shafts and including fluid pressure responsive means for completing both of said power trains, a source of fluid pressure, a control valve connected with said fluid pressure source and with said fluid pressure responsive means and having a low and a high speed position for completing the respective power trains in its said positions, a governor responsive to the speed of said driven shaft, a second valve hydraulically connected with said first named valve for passing fluid therethrough from said first named valve to the fluid pressure responsive means for said low speed power train, means connecting said second valve and governor whereby said governor holds said second valve in a position blocking fluid pressure second valve and governor whereby said governor sponsive means above a certain driven shaft speed, said second valve having unbalanced lands thereon subject to the fluid passed therethrough to said low speed fluid pressure responsive means for holding said second valve against the action of said governor whereby said low speed power train remains activated even though the driven shaft speed increases above said certain speed.

31. In transmission mechanism for an automotive vehicle, the combination of a drive shaft, a driven shaft, means for providing low and high speed power trains between said shafts and including fluid pressure engaged friction engaging means for completing both of said power trains, a source of fluid pressure, a control valve connected with said fluid pressure source and with said friction engaging means and having a low and a high ratio position for completing the respective power trains in its said positions, a governor responsive to the speed of said driven shaft, fluid pressure means under the control of said governor for providing a fluid pressure which varies with the governor speed, a second valve hydraulically connected with said first named valve for passing fluid therethrough from said first named valve to said low speed engaging means, said governor controlled pressure means being hydraulically connected with said second valve whereby the governor functions to hold said second valve in a position blocking fluid pressure application to said low speed engaging means above a certain driven shaft speed, said second valve having unbalanced lands thereon subject to the fluid passed therethrough to said low speed engaging means for holding said second valve against the action of said governor whereby said second valve remains in its low speed position even though the speed of said driven shaft increases above said certain speed.

32. In transmission mechanism for an automotive vehicle, the combination of a drive shaft, a driven shaft, means providing low and high speed power trains between said shafts and including fluid pressure responsive means for completing both of said power trains, a source of fluid pressure, a control valve connected with said fluid pressure source and having a low and a high ratio position for completing the respective power trains in its said positions, said control valve in its high ratio position connecting said pressure source to a first conduit for thereby completing said high ratio and in its low ratio position connecting said pressure source to a second conduit for thereby completing said low ratio, a governor responsive to the speed of said driven shaft, a second valve hydraulically connected by means of said second conduit with said first named valve for passing fluid therethrough from said first named valve to said low power train pressure responsive means, and means connecting said second valve and said governor whereby said governor holds said second valve in a position blocking passage of fluid through said second conduit from said first named valve to said low power train pressure responsive means above a certain driven shaft speed for preventing a change from the high speed power train to the low speed power train above said certain speed of said driven shaft.

33. In transmission mechanism for an automotive vehicle having a steering wheel for manually steering the vehicle, the combination of a drive shaft adapted to be driven by the engine of the vehicle, a driven shaft adapted to be connected to drive the vehicle, means providing low and high speed power trains between said shafts and including fluid pressure responsive means for completing both of said power trains, a source of fluid pressure, a selector valve connected with said fluid pressure source and with said fluid pressure responsive means and having a high and a low ratio position for completing the respective power trains in its said positions, said selector valve in its high ratio position connecting said pressure source to a first conduit for thereby completing said high ratio and in its low ratio position connectng said pressure source to a second conduit for thereby completing said low ratio, a selector lever disposed immediately below the steering wheel of the vehicle, means connecting said selector lever and said selector valve whereby the valve can be moved between its positions by said selector lever, a governor responsive to the speed of said driven shaft, a second valve hydraulically connected with said first named valve by means of said second conduit for passing fluid therethrough from said first named valve to said low power train fluid pressure responsive means, and means connecting said second valve and governor whereby said governor holds said second valve in a position blocking application of pressure through said second conduit to said low power train pressure responsive means above a certain driven shaft speed.

34. In transmission mechanism for an automotive vehicle, the combination of a drive shaft, a driven shaft, means providing low and high speed power trains between said shafts and including fluid pressure responsive means for completing both of said power trains, a source of fluid pressure, a control valve connected with said fluid pressure source and having a low and a high ratio position for completing the respective power trains in its said positions, said control valve in its high ratio position connecting said pressure source to a first conduit for thereby completing said high ratio and in its low ratio position connecting said pressure source to a second conduit for thereby completing said low ratio, a governor responsive to the speed of said driven shaft, a second valve hydraulically connected by means of said second conduit with said first-named valve for passing fluid therethrough from said first-named valve to said low power train pressure responsive means, means connecting said second valve and said governor whereby said governor holds said second valve in a position blocking passage of fluid through said second conduit from said first-named valve to said low power train pressure responsive means above a certain driven shaft speed for preventing a change from the high speed power train to the low speed power train above said certain speed of said driven shaft, and a third valve under the influence of the fluid passed through said second-named valve to said low power train pressure responsive means for disapplying fluid pressure to the pressure responsive means for said high power train and breaking said high power train when pressure is applied through said second-named valve to said low power train pressure responsive means completing the low power train.

References Cited in the file of this patent

UNITED STATES PATENTS

| | | |
|---|---|---|
| Re. 21,844 | Vetter | June 24, 1941 |
| 1,619,701 | Chorlton | Mar. 1, 1927 |
| 2,013,126 | Bonn | Sept. 3, 1935 |
| 2,088,782 | Ford | Aug. 3, 1937 |
| 2,193,304 | Thompson | Mar. 12, 1940 |
| 2,204,872 | Thompson | June 18, 1940 |
| 2,205,470 | Donn | June 25, 1940 |
| 2,221,393 | Carnegie | Nov. 12, 1940 |
| 2,223,716 | Bojesen | Dec. 3, 1940 |
| 2,229,345 | Schotz | Jan. 21, 1941 |
| 2,251,625 | Hale | Aug. 5, 1941 |
| 2,278,351 | Havens et al. | Mar. 31, 1942 |
| 2,282,949 | Dolza | May 12, 1942 |
| 2,319,388 | Cotterman | May 18, 1943 |
| 2,332,593 | Nutt et al. | Oct. 26, 1943 |
| 2,343,955 | Cotterman | Mar. 14, 1944 |
| 2,352,212 | Lang et al. | June 27, 1944 |
| 2,377,696 | Kelley | June 5, 1945 |
| 2,430,258 | Thompson | Nov. 4, 1947 |
| 2,516,203 | Greenlee | July 25, 1950 |
| 2,516,208 | Hasbany | July 25, 1950 |
| 2,627,189 | McFarland | Feb. 3, 1953 |
| 2,629,265 | Dodge | Feb. 24, 1953 |
| 2,633,035 | Livermore | Mar. 31, 1953 |
| 2,633,760 | Kelley | Apr. 7, 1953 |
| 2,651,949 | Barnes | Sept. 15, 1953 |

FOREIGN PATENTS

| | | |
|---|---|---|
| 48,019 | France | Oct. 16, 1937 |
| | (Addition to No. 809,102) | |